(12) United States Patent
Singh et al.

(10) Patent No.: US 9,167,597 B2
(45) Date of Patent: Oct. 20, 2015

(54) METHODS AND APPARATUS FOR TRANSMISSION OF UPLINK SOUNDING REFERENCE SIGNALS IN A COMMUNICATION SYSTEM WITH LARGE NUMBER OF ANTENNAS

(71) Applicant: Samsung Electronics Co., LTD, Suwon-si, Gyeonggi-do (KR)

(72) Inventors: Jaspreet Singh, Richardson, TX (US); Zhouyue Pi, Allen, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 138 days.

(21) Appl. No.: 13/938,929

(22) Filed: Jul. 10, 2013

(65) Prior Publication Data

US 2014/0016620 A1    Jan. 16, 2014

Related U.S. Application Data

(60) Provisional application No. 61/671,563, filed on Jul. 13, 2012.

(51) Int. Cl.
*H04W 72/12* (2009.01)
*H04W 56/00* (2009.01)
*H04L 5/00* (2006.01)

(52) U.S. Cl.
CPC ......... *H04W 72/1284* (2013.01); *H04L 5/0023* (2013.01); *H04L 5/0032* (2013.01); *H04L 5/0048* (2013.01); *H04L 5/0078* (2013.01); *H04W 56/003* (2013.01); *H04W 56/0005* (2013.01); *H04W 56/0045* (2013.01)

(58) Field of Classification Search
None
See application file for complete search history.

(56) References Cited

U.S. PATENT DOCUMENTS

2010/0303034 A1  12/2010 Chen et al.
2011/0268028 A1* 11/2011 Stern-Berkowitz et al. .. 370/328
(Continued)

FOREIGN PATENT DOCUMENTS

KR  10-2011-0093632     8/2011
WO  WO 2011/073830 A1  6/2011
WO  WO 2011/099970 A1  8/2011

OTHER PUBLICATIONS

International Search Report dated Nov. 19, 2013 in connection with International Patent Application No. PCT/KR2013/006287, 3 pages.
(Continued)

*Primary Examiner* — Faruk Hamza
*Assistant Examiner* — Cassandra Decker

(57) ABSTRACT

Methods for preventing timing collisions in a wireless communication network include transmitting a data uplink symbol of normal duration via a first base pair using a first timing advance (TA) corresponding to the first base pair. Scheduling to transmit a second uplink symbol via a second base pair (BP) corresponding to the transmit RF chain. Predicting a timing collision will occur based on a different between the first TA and a second TA corresponding to the second BP. Preventing the timing collision by: reducing the duration of the second symbol by an adjustment amount calculated based on the first TA and the second TA; inserting a guard interval to delay transmission of the second symbol by the calculated adjustment amount; and increasing the duration of a cyclic prefix of the second symbol but refraining from transmitting a portion of the enlarged CP.

25 Claims, 12 Drawing Sheets

(56) References Cited

U.S. PATENT DOCUMENTS

| | | | |
|---|---|---|---|
| 2011/0292917 A1* | 12/2011 | Fan et al. | 370/336 |
| 2012/0307821 A1 | 12/2012 | Kwon et al. | |
| 2013/0195002 A1* | 8/2013 | Walker et al. | 370/312 |
| 2013/0195084 A1* | 8/2013 | Chen et al. | 370/336 |
| 2013/0201911 A1* | 8/2013 | Bergstrom et al. | 370/328 |

OTHER PUBLICATIONS

Written Opinion of the International Searching Authority dated Nov. 19, 2013 in connection with International Patent Application No. PCT/KR2013/006287, 5 pages.

Pantech, "Simultaneous Transmission in Multiple TA", R1-120318, 3GPP TSG RAN1, #68, Dresden, Germany, Feb. 6-10, 2012, 3 pages.

* cited by examiner

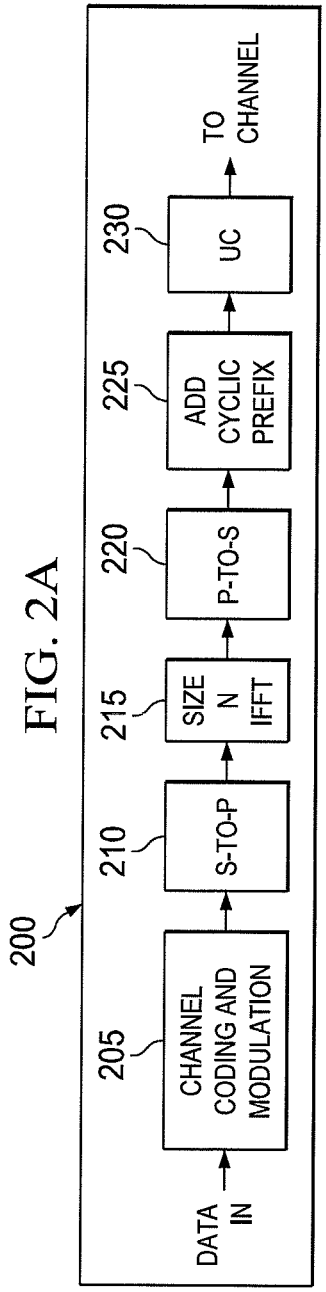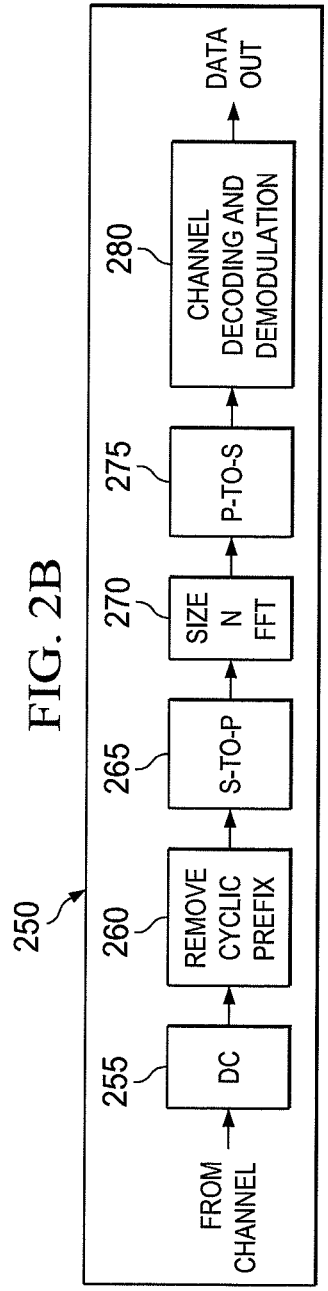

METHODS AND APPARATUS FOR TRANSMISSION OF UPLINK SOUNDING REFERENCE SIGNALS IN A COMMUNICATION SYSTEM WITH LARGE NUMBER OF ANTENNAS

CROSS-REFERENCE TO RELATED APPLICATION AND CLAIM OF PRIORITY

The present application claims priority to U.S. Provisional Patent Application Ser. No. 61/671,563, filed Jul. 13, 2012, entitled "METHODS AND APPARATUS FOR TRANSMISSION OF UPLINK SOUNDING REFERENCE SIGNALS IN A COMMUNICATION SYSTEM WITH LARGE NUMBER OF ANTENNAS." The content of the above-identified patent documents is incorporated herein by reference.

TECHNICAL FIELD

The present application relates generally to wireless communication networks, and more specifically to a methods and apparatus for transmission of uplink sounding reference signals in a communication system with large number of antennas.

BACKGROUND

The field of mobile communication has witnessed a great revolution over the past two decades, with rapid development of new technologies to satisfy the ever increasing appetite for mobile communication applications and services. Examples of such technologies include CDMA 2000 Evolution Data Optimized (also referred to as 1xEV-DO) systems developed by Third Generation Partnership Project 2 (3GPP2), Wideband Code Division Multiple Access (WCDMA), High Speed Packet Access (HSPA), and LTE systems developed by 3GPP, and mobile Worldwide Interoperability for Microwave Access (WiMAX) systems developed by Institute of Electrical and Electronics Engineers (IEEE). Although the wireless technologies, such as LTE/LTE-A can provide data rates in the range of tens to hundreds of megabits per second (mbps), their capacity may soon be exhausted by increasing demands for even higher data rates required by data hungry applications such as video and music streaming. Furthermore, the number of subscribers to mobile communication services (already exceeding 5 billion), is expected to continue to grow rapidly.

In REF1, it is proposed to utilize the millimeter (mm) spectrum for developing the next generation of broadband mobile communication systems. Millimeter waves (mm-Waves) refer to radio waves with wavelength in the range of 1 mm-10 mm, which corresponds to radio frequency of 30 GHz-300 GHz (herein "the millimeter wave band" or "the mmWave band"). Vast amount of spectrum (both licensed and unlicensed) are available in the millimeter wave band. For instance, in the United States, 7 GHz of unlicensed spectrum is available around 60 GHz frequency (referred to as the 60 GHz band). Further, in October 2003, the Federal Communications Commission (FCC) allocated 12.9 GHz of spectrum for high-density fixed wireless services in the United States ((71-76 GHz, 81-86 GHz, and 92-95 GHz excluding the 94.0-94.1 GHz for Federal Government use). This spectrum allocation, collectively referred to as the E-band, is the largest spectrum allocation ever by FCC--50 times larger than the entire cellular spectrum.

SUMMARY

A method for preventing timing collisions in a wireless communication network is provided. The method includes generating a first symbol for uplink transmission on a first beam pair. Each beam pair includes one transmit radio frequency (RF) chain of a transmitter and one receive RF chain of a receiver. The method includes scheduling a transmission of the first symbol to the receiver through the first beam pair to commence at a first time and to end transmission of the first symbol at a second time subsequent to the first time. The method includes generating a second symbol (for example, a sounding reference signal (SRS)) for uplink transmission on a second beam pair different from the first beam pair. The method includes scheduling the second symbol transmission of the second symbol to the receiver to commence at the second time. The method includes determining a first timing advance corresponding to the first beam pair. The method includes determining a second timing advance corresponding to the second beam pair and transmitting the first symbol through the first beam pair an initial time in advance of the first time by an amount of the first timing advance. The method includes transmitting the second symbol through the second beam pair at a third time in advance of the second time by an amount of the second timing advance and calculating an adjustment amount by which to one of: delay the transmission of the second symbol, and modify a duration of the second symbol.

A mobile station that prevents timing collisions in a wireless communication network is provided. The mobile station includes a transmitter configured to send control and data signals to a base station. The mobile station includes processing circuitry configured to generate a first symbol for uplink transmission on a first beam pair, wherein each beam pair includes one transmit radio frequency (RF) chain of a transmitter and one receive RF chain of a receiver. The processing circuitry is configured to schedule a transmission of the first symbol to the receiver through the first beam pair to commence at a first time and to end transmission of the first symbol at a second time subsequent to the first time. The processing circuitry is configured to generate a second symbol (namely, a sounding reference signal (SRS)) for uplink transmission on a second beam pair different from the first beam pair. The processing circuitry is configured to schedule a transmission of the second symbol to the receiver to commence at the second time. The processing circuitry is configured to determine a first timing advance corresponding to the first beam pair. The processing circuitry is configured to determine a second timing advance corresponding to the second beam pair and to transmit the first symbol through the first beam pair an initial time in advance of the first time by an amount of the first timing advance. The processing circuitry is configured to transmit the second symbol through the second beam pair at a third time in advance of the second time by an amount of the second timing advance. The processing circuitry is configured to calculate an adjustment amount by which to one of: delay the transmission of the second symbol, and modify a duration of the second symbol.

A system for preventing timing collisions in a wireless communication network is provided. The wireless communication system includes a base station configured to form beams in a directional communication system. The system includes a mobile station that comprises an antenna array comprising a plurality of antennas. The mobile station includes a transmitter configured to send control and data signals to the base station. The mobile station includes processing circuitry configured to generate a first symbol for uplink transmission on a first beam pair, wherein each beam pair includes one transmit radio frequency (RF) chain of a transmitter and one receive RF chain of a receiver. The processing circuitry is configured to schedule a transmission of the first symbol to the receiver through the first beam pair to commence at a first time and to end transmission of the first symbol at a second time subsequent to the first time. The processing circuitry is configured to generate a second symbol (for example, a sounding reference signal (SRS)) for uplink transmission on a second beam pair different from the first beam pair. The processing circuitry is configured to schedule transmission of the second symbol to the receiver to commence at the second time. The processing circuitry is configured to determine a first timing advance corresponding to the first beam pair. The processing circuitry is configured to determine a second timing advance corresponding to the second beam pair and to transmit the first symbol through the first beam pair an initial time in advance of the first time by an amount of the first timing advance. The processing circuitry is configured to transmit the second symbol through the second beam pair at a third time in advance of the second time by an amount of the second timing advance. The processing circuitry is configured to calculate an adjustment amount by which to one of: delay the transmission of the second symbol, and modify a duration of the second symbol.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates a high-level diagram of a wireless transmit path according to an embodiment of the present disclosure;

FIG. 2B illustrates a high-level diagram of a wireless receive path according to an embodiment of the present disclosure;

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device or system.

The following documents and standards descriptions are hereby incorporated into the present disclosure as if fully set forth herein: (i) Zhouyue Pi, Farooq Khan, "An introduction to millimeter-wave mobile broadband systems", IEEE Communications Magazine, appears in June 2011 (herein referred to as "REF1"); (ii) "Millimeter wave propagation: Spectrum management implications", Federal Communications Commission, Office of Engineering and Technology, Bulletin Number 70, July, 1997 (herein referred to as "REF2"); and (iii) J. Singh, Z. Pi, Y. Li, "Methods and apparatus for uplink timing alignment in millimeter wave mobile communication system" 2012 (herein referred to as "REF3").

Figure 1:
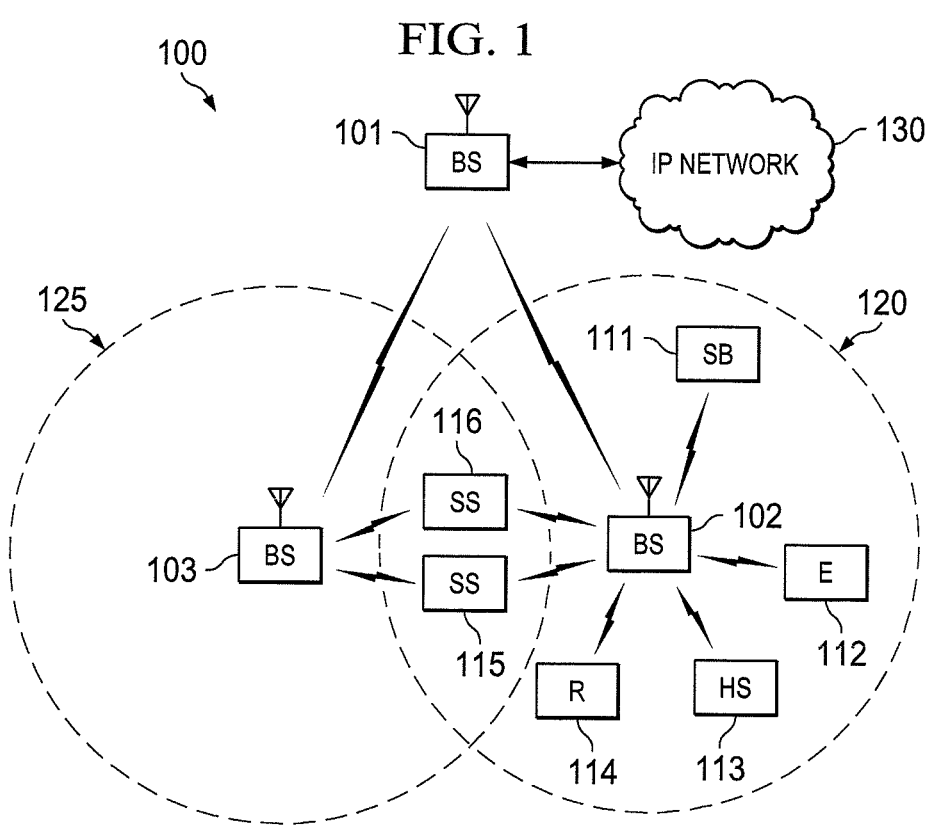
FIG. 1 illustrates a wireless network according to an embodiment of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes base station (BS) 101, BS 102, and BS 103. The BS 101 communicates with BS 102 and BS 103. The BS 101 also communicates with Internet protocol (IP) network 130, such as the Internet, a proprietary IP network, or other data network.

Depending on the network type, other well-known terms may be used instead of "base station," such as "eNodeB" (eNB) or "access point." For the sake of convenience, the term "base station" or "BS" is used herein to refer to the network infrastructure components that provide wireless access to remote terminals. In addition, the term "mobile station" or "MS" is used herein to designate to refer to remote terminal or any remote wireless equipment that wirelessly accesses a base station, or that can be used by a consumer to access services via the wireless communication network. The term "mobile station" is used whether the mobile station is a mobile device (e.g., cell phone) or is normally considered a stationary device (e.g., desktop personal computer, vending machine, etc.). In other systems, other well-known terms may be used instead of "mobile station", such as "subscriber station" (SS), "remote terminal" (RT), "wireless terminal" (WT), "user equipment" (UE) and the like.

The base station 102 provides wireless broadband access to network 130 to a first plurality of mobile stations (MSs) within coverage area 120 of base station 102. The first plurality of MSs includes MS 111, which may be located in a small business; MS 112, which may be located in an enterprise; MS 113, which may be located in a WiFi hotspot; MS 114, which may be located in a first residence; MS 115, which may be located in a second residence; and MS 116, which may be a mobile device, such as a cell phone, a wireless laptop, a wireless PDA, or the like. MSs 111-116 may be any wireless communication device, such as, but not limited to, a mobile phone, mobile PDA and any mobile station (MS).

The BS 103 provides wireless broadband access to a second plurality of MSs within coverage area 125 of BS 103. The second plurality of MSs includes MS 115 and MS 116. In some embodiments, one or more of BSs 101-103 may communicate with each other and with MSs 111-116 using long-term evolution (LTE) or LTE-Advanced (LTE-A) techniques including techniques for: preventing symbol collisions due to timing in beam communications with a large number of antennas in a wireless communication networks described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace BSs 101-103 and MSs 111-116. Wired connections may replace the wireless connections depicted in FIG. 1.

FIG. 2A is a high-level diagram of a wireless transmit path. FIG. 2B is a high-level diagram of a wireless receive path. In FIGS. 2A and 2B, the transmit path 200 may be implemented, e.g., in BS 102 and the receive path 250 may be implemented, e.g., in a MS, such as MS 116 of FIG. 1. It will be understood, however, that the receive path 250 could be implemented in an BS (e.g. BS 102 of FIG. 1) and the transmit path 200 could be implemented in a MS. In certain embodiments, transmit path 200 and receive path 250 are configured to perform methods for preventing symbol collisions due to timing in beam communications with a large number of antennas in a wireless communication networks.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDP I functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and MS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at MS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FPI block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of BSs 101-103 may implement a transmit path that is analogous to transmitting in the downlink to MSs 111-116 and may implement a receive path that is analogous to receiving in the uplink from MSs 111-116. Similarly, each one of MSs 111-116 may implement a transmit path corresponding to the architecture for transmitting in the uplink to BSs 101-103 and may implement a receive path corresponding to the architecture for receiving in the downlink from BSs 101-103.

In certain embodiments of the present disclosure, each of the transmit path 200 and the receive path 250 includes a radio frequency (RF) chain including a data converter and RF signal processing components (e.g., mixer, filter, up-converter, down-converter, amplifier, and the link). For each antenna in a mobile station, the mobile station includes an associated RF chain. A receive type RF chain forms receiver type beams in a directional communication system. A transmit type RF chain forms transmitter type beams in a directional communication system. An antenna array that includes multiple antennas can concurrently form and transmit multiple beams.

Figure 3:
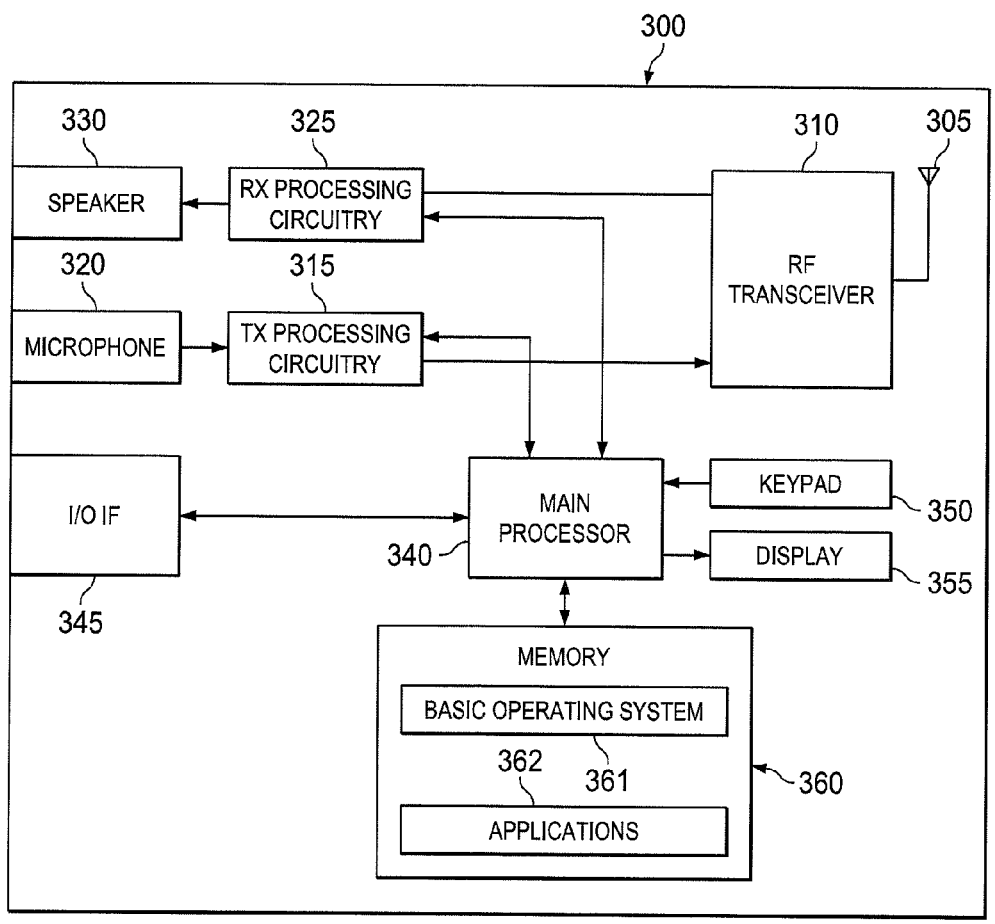
FIG. 3 illustrates a subscriber station according to embodiments of the present disclosure.

FIG. 3 illustrates a mobile station 300 according to embodiments of the present disclosure. The embodiment of mobile station 300, such as MS 116, illustrated in FIG. 3 is for illustration only. Other embodiments of the wireless subscriber station could be used without departing from the scope of this disclosure. Although MS 300 is depicted by way of example, the description of FIG. 3 can apply equally to any of MS 111, MS 112, MS 113, MS 114, MS 115 and MS 116.

MS 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for preventing symbol collisions due to timing in beam communications with a large number of antennas in a wireless communication networks. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides mobile station 300 with the ability to connect to other devices such as laptop computers and handheld computers. I/O interface 345 is the communication path between these accessories and main controller 340.

Main processor 340 is also coupled to keypad 350 and display unit 355. The operator of mobile station 300 uses keypad 350 to enter data into mobile station 300. Display 355 may be a liquid crystal display capable of rendering text and/or at least limited graphics from web sites. Alternate embodiments may use other types of displays.

The millimeter (mm) spectrum may be utilized for broadband mobile communication systems. According to REF2, radio waves in the mmWave band exhibit several unique propagation characteristics. For example, compared with lower frequency radio waves, mmWaves suffer higher propagation loss, have poorer ability to penetrate objects, such as buildings, walls, foliage, and are more susceptible to atmosphere absorption, deflection and diffraction due to particles (for example, rain drops) in the air. Given these propagation characteristics, it is crucial to employ high-gain (directional) antennas to communicate over the mmWave band. Fortunately, due to the smaller wavelength of the mmWaves, more antennas can fit in relatively a small area, making it feasible to design high-gain antennas in small form factors.

The commercial viability of the mmWave spectrum for mobile communication has been limited by the fact that mmWave RFIC development is based on expensive packaging techniques and involves the use of compound semiconductor processes. Only recently, there have been advances in development of mmwave transceivers in inexpensive silicon processes using low-cost packaging techniques. The inexpensive silicon processes using low-cost packaging techniques for transceivers has spurred several recent engineering and business efforts for commercial exploitation of the mmWave spectrum, particularly in the context of short-range wireless communication. In particular, certain technologies and standards to transmit data at Gigabits/sec (Gbps) rate use the unlicensed 60 GHz band within a few meters (up to 10 meters). Several industrial standards have also been developed targeting similar performance (for example, WirelessHD technology, ECMA-387, and IEEE 802.15.3c), with a couple of other organizations also actively developing competing short-range 60 GHz Gbps connectivity technology, such as the Wireless Gigabit Alliance (WGA) and the IEEE 802.11 task group ad (TGad). Integrated circuit (IC) based transceivers are also now available for some of these technologies. For example, low-cost, low-power 60 GHz RFIC and antenna solutions are developing.

The aforementioned technological advances in the development of low-cost low-power mmWave RFIC and antenna solutions open up new avenues for mmWave communication system. In REF1, a fifth generation (5G) mobile broadband communication system, exploiting the vast mmWave spectrum is described. An essential component of the 5G system is the directional nature of communication between the base station (BS) and the mobile station (MS), in order to overcome the severe propagation losses encountered at mmWave frequencies. This directional nature of communication, wherein the BS and the MS communicate using beams (typically formed using a large number of antennas), as opposed to using omni-directional communication in mobile systems, poses new challenges, and calls for innovations, in several aspects of communication system design. In this disclosure, we focus on the issue of uplink sounding reference signal (SRS) transmission in a communication system with large number of antennas. In particular, the present disclosure provides solutions to the problem of time alignment of the SRS signals received at the BS.

Figure 4:
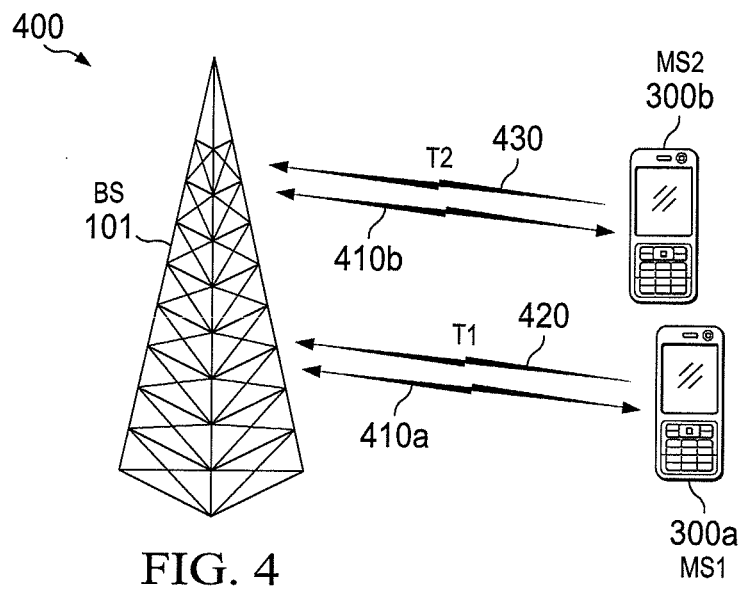
FIG. 4 illustrates a different propagation delay of signals transmitted from multiple mobile stations to a base station according to the present disclosure.

FIG. 4 illustrates a different propagation delay of signals transmitted from multiple mobile stations to a base station according to the present disclosure. In FIG. 4, a cellular mobile communication system 400 employs multiple access techniques (such as orthogonal frequency division multiple access (OFDMA) in 3GPP LTE/LTE-A). When multiple mobile stations, such as MS1 300a and MS2 300b (which each include features and components of the mobile station 300, and can be the mobile station 300) transmit data on the uplink channel (MS to BS), the transmissions 410a and 410b are synchronized to ensure that the data from different MSs is received by the BS 101 at the same time. This maintains orthogonality between the multiple mobile stations multiplexed across frequency, and also avoids potential collisions between MSs transmitting at different time instants. For OFDMA systems, absolute timing synchronization is not mandatory, as long as the timing offset falls within the cyclic prefix (CP) duration (described in more particular detail with reference to FIG. 15). The need for ensuring synchronization on the uplink transmission arises because different MSs have different locations relative to the BS 101, and hence the data transmitted by the MSs undergoes different propagation delays. FIG. 4 shows wireless communication system 400, where a MS1 300a and a MS2 300b transmit to the BS 101. The MS1 300a is closer to the BS 101 than the MS2 300b. That is, the distance 410a from MS1 300a to the BS 101 is shorter than the distance 410b from MS2 300b to the BS 101. As a result of the difference in distances 410a, 410b, the signal 420 (carrying data, such as an OFDM symbol) from the MS1 300a undergoes a smaller propagation delay than the signal 430 (carrying data, such as an OFDM symbol) from MS2 300b. Without any timing adjustments, the signal 420 sent from MS1 300a is expected to be received at the BS 101 before the signal sent from MS2 300b reaches the BS 101.

To ensure uplink timing synchronization, each MS 300a and 300b adjusts its timing before transmitting signals (also referred to herein as "data") to the BS 101. This is referred to as timing advance (TA). In certain communication systems 500 (such as LTE), the BS 101 informs the MS 300 of the appropriate TA that the MS 300 should employ. For example, the BS 101 instructs the MS 300 to use a specified timing advance. The base station 101 informs a MS 300 with a larger propagation delay to use a longer TA than an MS with a smaller propagation delay. Referring to FIG. 4, the BS 101 assigns a longer timing advance to the second mobile station 300b and assigns a shorter TA to the first mobile station 300a.

Figure 5:
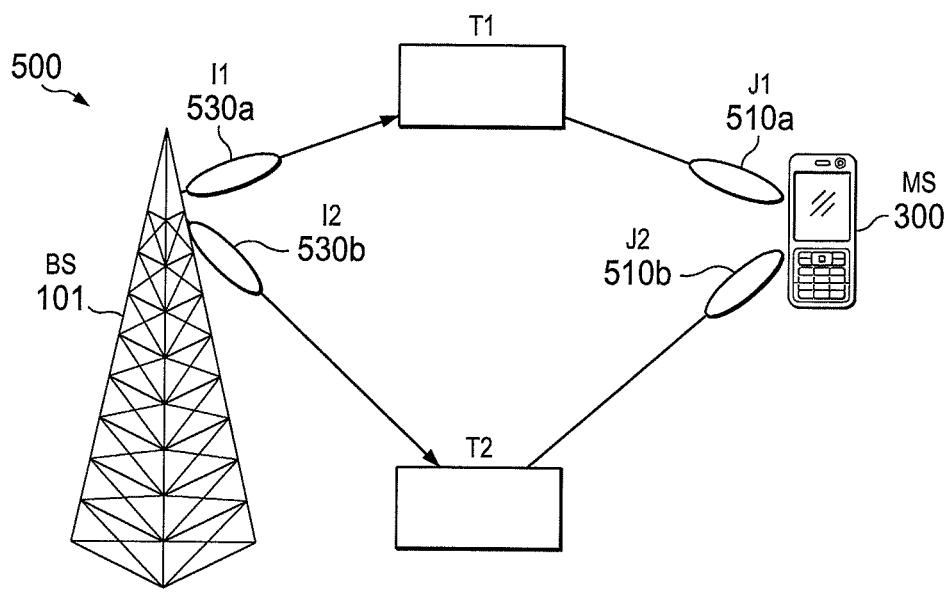
FIG. 5 illustrates a directional communication system wherein propagation delay is dependent upon the beam directions used for communication according to the present disclosure.

FIG. 5 illustrates a directional communication system 500 wherein propagation delay dependent upon the beam directions used for communication according to the present disclosure. In a communication system 500 with a large number of antennas, wherein the MS 300 and BS 101 communicate using beams (herein referred to as a directional communication system), the issue of timing advance becomes more complicated because the propagation delays experienced on the different beam pair combinations that may be employed by a particular MS 300 to communicate with the BS 101 may also be variable. In an example shown in FIG. 5, the MS 300 can form one of two beams including beam J1 510a or beam J2 510b; the BS 101 can form one of the two beams including beam I1 530a or beam I2 530b. As a result, the MS 300 can communicate with the BS 101 using any one or more of the four beam pair combinations: (I1 J1), (I1,J1), (I2, J1), (I2, J2). FIG. 5 shows two of the four combinations:(I1, J1) and (I2, J2). The propagation delays experienced on these beam pair combinations can be different. Consequently, to ensure uplink timing synchronization, the MS 300 needs to apply a different TA when communicating using different beam pair combinations. That is, the mobile station 300 applies a timing advance corresponding to the selected beam pair used for transmitting a signal to the BS 101.

Figure 6:
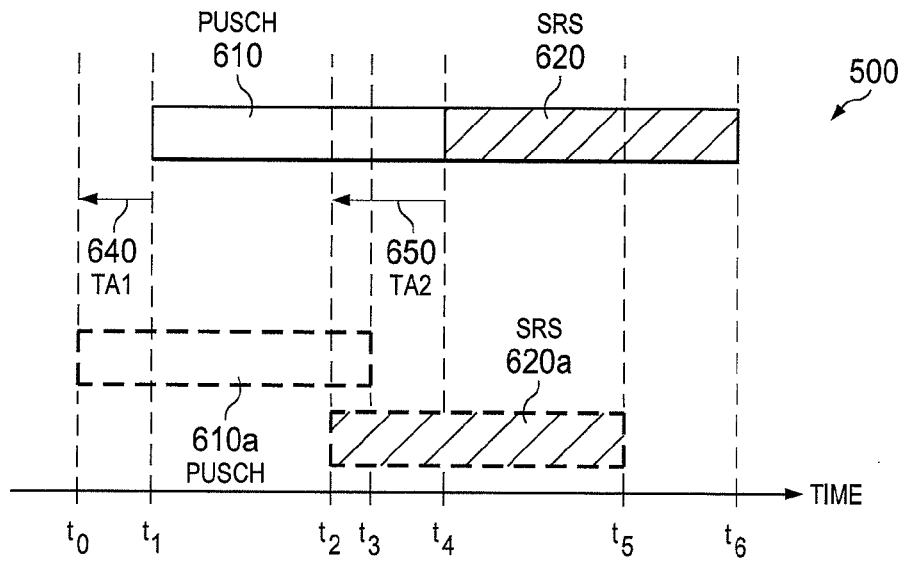
FIG. 6 illustrates consecutive symbols transmitted with different timing advance values resulting in a signal collision according to the present disclosure.

FIG. 6 illustrates consecutive symbols transmitted with different timing advance values resulting in a signal collision according to the present disclosure. The present disclosure uses methods for efficient computation of the different TA values needed for communication between a particular MS 300 and the BS 101. In this disclosure, different TA values are applied on the different beam pairs. Embodiments of the present disclosure include methods to overcome these challenges imposed by the use of the different TA values on different beam pairs.

Specifically, consider the transmission of the uplink (MS to BS) sounding reference signals (SRS). The SRS is transmitted by the MS 300 to help the BS 101 evaluate the quality of the uplink channel. Subsequently, the BS 101 receives and uses the SRS to make channel-sensitive scheduling decisions and for link adaptation. In a directional communication system, such as the communication system 500, the MS 300 transmits the SRS in several different beam directions to help the BS 101 assess the channel quality on different beams. Transmissions in different beam directions performed using a different timing advance value for each direction has the potential to cause timing problems at the MS 300.

FIG. 6 shows an example timing diagram, wherein, within a particular subframe, the MS 300 transmits data 610 to the BS 101 using the physical uplink shared channel (PUSCH). During the designated SRS symbol (s) within this subframe, the MS 300 transmits uplink SRS signal 620 as well. If the beam pair combination for which the MS needs to transmit the SRS 620 (for example, beam pair 2) is different from the beam pair combination (for example, beam pair 1) used for data transmission 610 on PUSCH, potential collisions result. More particularly, if the TA 640 (referred to as TA1) required for data transmission 610 on beam pair 1 (namely, from the beam pair combination used for data transmission on PUSCH) is shorter or smaller than the TA 650 (referred to as TA2) required for SRS transmission 620 on beam pair 2, then, the MS 300 needs to begin transmitting the SRS 620 before the MS 300 has finished transmitting the data 610 on the PUSCH symbol preceding the SRS symbol.

When a mobile station does not execute timing advance methods, the data 610 on the PUSCH is transmitted via a first beam pair to the base station 101 beginning at a time $t_1$ and ending at a time $t_4$. The SRS is transmitted via a second beam pair to the base station 101 beginning at the time $t_4$ and ending at a time $t_6$.

When a mobile station executes timing advance methods, the mobile station can respond to receiving an instruction from the base station 101 by applying a first timing advance TA1 640 assigned by the BS to data 610 transmitted on the PUSCH symbol, and by applying a second timing advance TA2 650 assigned by the BS to the SRS 620. That is, the mobile station is instructed to begin transmitting data 610 on the time-advanced PUSCH data 610a (which is the same as data 610, simply preponed) at time $t_0$ and to begin transmitting the next signal, the time-advanced SRS 620a (which is the same as SRS 620, simply preponed), at time $t_2$ and to complete transmission of the data 610 at time $t_3$ and to complete transmission of the SRS 620 at time $t_5$.

The time $t_2$ to begin transmitting the SRS 620 occurs before the mobile station completes transmission of the data 610 on the PUSCH. As a result, a timing collision occurs from the beginning of the SRS transmission at time $t_2$ through the end of the PUSCH transmission a time $t_3$. That is, when the timing advance TA2 650 of a subsequent signal (namely, SRS 620) is greater than the timing advance TA1 640 of a preceding signal, then a timing collision occurs during the time period $t_2$ to $t_3$, when the mobile station is instructed to transmit a later portion of the preceding signal (namely, data 610 on the PUSCH) and to simultaneously instructed to transmit a beginning portion of the subsequent signal (namely, SRS 620) starting at time $t_2$. The collision can endure for a period of time equal to the difference in timing advances TA2 650 and TA1 640.

Figure 7:
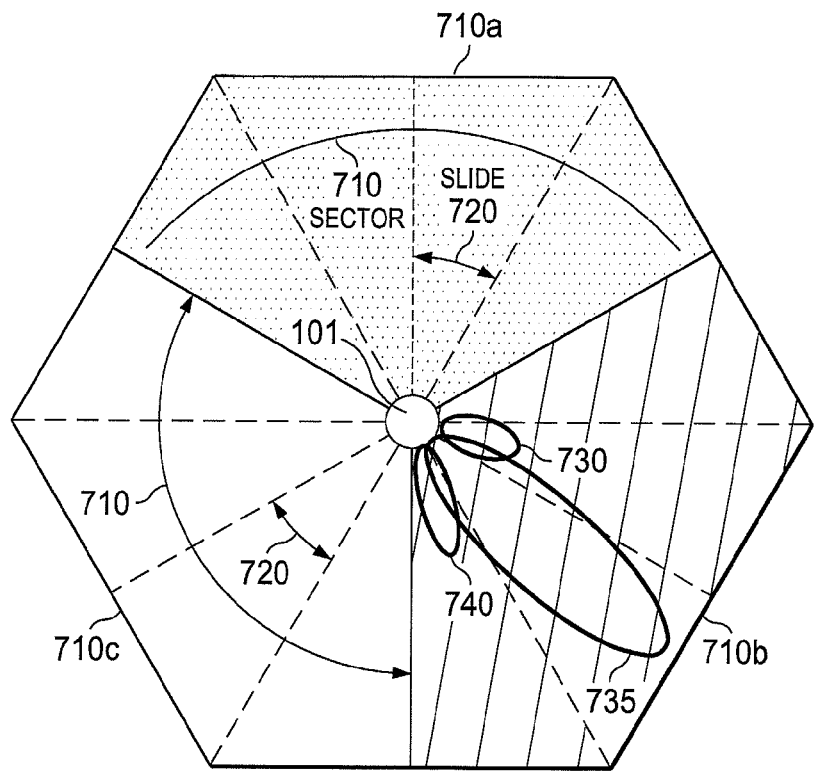
FIG. 7 illustrates a beam forming at a base station in a directional communication system according to embodiments of the present disclosure.

FIG. 7 illustrates a beam forming at a base station in a directional communication system according to embodiments of the present disclosure. Although certain details will be provided with reference to the components of the base station 101, it should be understood that other embodiments may include more, less, or different components.

The base station 101 is configured to form beams in a directional communication system, such as the directional communication system 500. In this depiction, each sector 710 in the base station 101 is divided into sub-sectors 720, or, slices 720. The BS 101 forms and steers beams 730, 735, 740 to lie within any of the slices. In the example shown in FIG. 7, the BS 101 has three sectors 710, including first sector 710a (shown with square hatching), second sector 710b (shown with striped hatching), and third sector 710c (shown with solid hatching). The number of slices 720 in this example is, 4, in each sector. In a similar manner, it can be assumed that the MS is also capable of forming and steering beams within one of a given number of directions. As an example of four possible beam directions at the BS and at the MS, Table 1 shows a table of timing advance (TA) values that are stored in a memory 360 the MS or the BS 101 to keep track of the TA value to be applied for communication on any particular beam pair combination.

TABLE 1

Set of different timing advance values corresponding to beam pair

| BS beam index | MS beam index | | | |
|---|---|---|---|---|
| | 1 | 2 | 3 | 4 |
| 1 | TA1,1 | TA1,2 | TA1,3 | TA1,4 |
| 2 | TA2,1 | TA2,2 | TA2,3 | TA2,4 |
| 3 | TA3,1 | TA3,2 | TA3,3 | TA3,4 |
| 4 | TA4,1 | TA4,2 | TA4,3 | TA4,4 |

FIG. 8A illustrates a sounding resource signal (SRS) transmission scheme in a directional communication system according to embodiments of the present disclosure. The embodiment of the sounding resource signal (SRS) transmission scheme shown in FIG. 8A is for illustration only. Other embodiments could be used without departing from the scope of this disclosure.

The SRS transmission scheme includes frequency multiplexing and time multiplexing. The data symbols are transmitted via time multiplexed data signals 810. The SRS 820 to be transmitted by a particular mobile station 300 for different beam pair combinations can be multiplexed across time or frequency. According to the example shown in FIG. 8A, beam pairs BP1-BP8 are multiplexed across time or frequency. Beam pairs BP1-BP4 are frequency multiplexed, and beam pairs BP5-BP8 are time multiplexed.

In certain embodiments, when transmitting the SRS corresponding to a particular beam pair combination, the MS 300 applies the appropriate TA value that corresponds to the particular beam pair combination. That is, when transmitting the SRS 820 for a first beam pair, the MS applies a first timing advance corresponding to the first beam pair, and when transmitting the SRS 820 for a second beam pair, the MS applies a second timing advance corresponding to the second beam pair. As another example of such embodiments, in reference to FIG. 6, when transmitting the PUSCH 610 for a first beam pair, the MS applies the corresponding timing advance TA1, when transmitting the SRS 620 corresponding to the second beam pair, the MS applies the corresponding timing advance TA2, and so forth.

In order to transmit the SRS 820 corresponding to different beam pairs at the same time (for example, by multiplexing across frequency), the MS includes the hardware capability to be able to generate different beams simultaneously. For example, the MS can be equipped with multiple antenna arrays, each antenna array able to generate an independent beam direction, with the ability to apply a different TA to each antenna array. The different TA values are applied to the transmissions from different arrays, thereby ensuring synchronization of the received transmissions at the BS.

Figure 8:
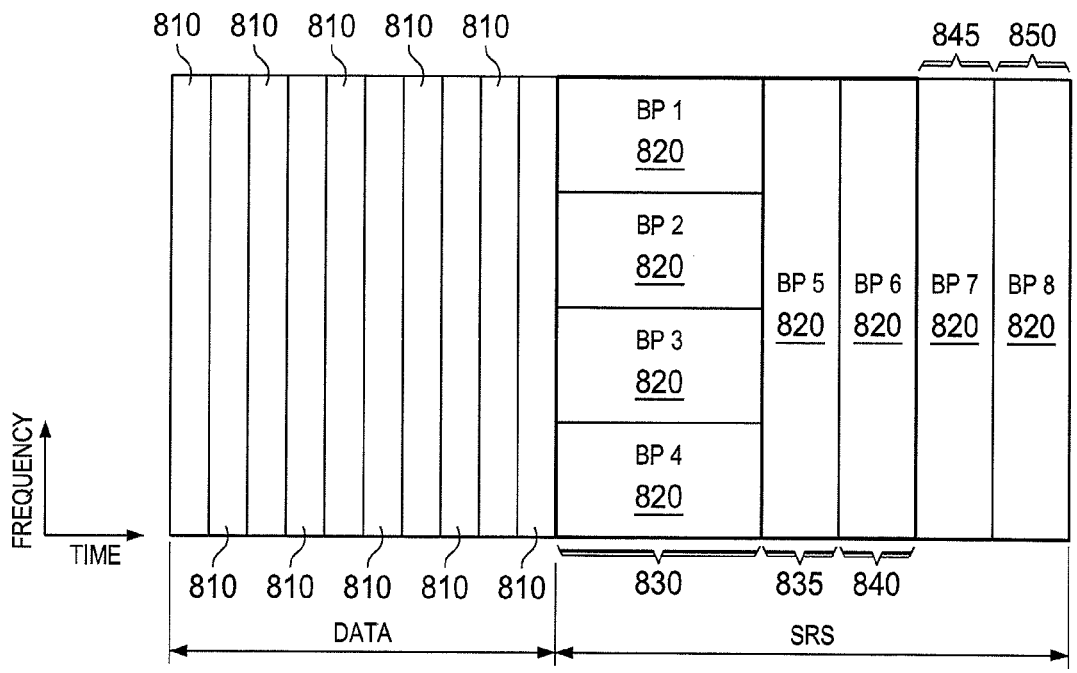
FIG. 8 illustrates a sounding resource signal (SRS) transmission according to frequency multiplexing and time multiplexing according to embodiments of the present disclosure.

As an example, referring to Table 1 and FIG. 8, a mobile station 300 including an antenna array of four antennas, can simultaneously transmit the SRS 820 from each of the four antennas. At a first time period 830 the first antenna transmits the SRS 820 using beam pair BP1 and a timing advance corresponding to BP1. The second antenna transmits the SRS 820 using BP2 and a timing advance corresponding to BP2. The third antenna transmits the SRS using BP3 and a timing advance corresponding to BP3. The fourth antenna transmits the SRS using BP4 and a timing advance corresponding to BP4. And so forth, such as in the case of an antenna array including more than four antennas. During the second time period 835 through fifth time period 850, the mobile station 300 transmits SRS on beam pairs BP5-BP8 one after the other, using one of the four antennas at a time. For instance, during the second time period 835, the mobile station 300 transmits the SRS 820 using BP5 using a first antenna, and then transmits the SRS 820 using BP6 during a third time period 840 using a second antenna.

Whenever the MS switches the beam formed by a particular antenna array, a different TA needs to be applied. As illustrated in FIG. 6, this can potentially cause timing issues at the MS. Embodiments of the present disclosure, and more particularly the embodiments described with reference to FIGS. 9-15, include methods to prevent symbol collisions caused by timing in beam communications.

Figure 9:
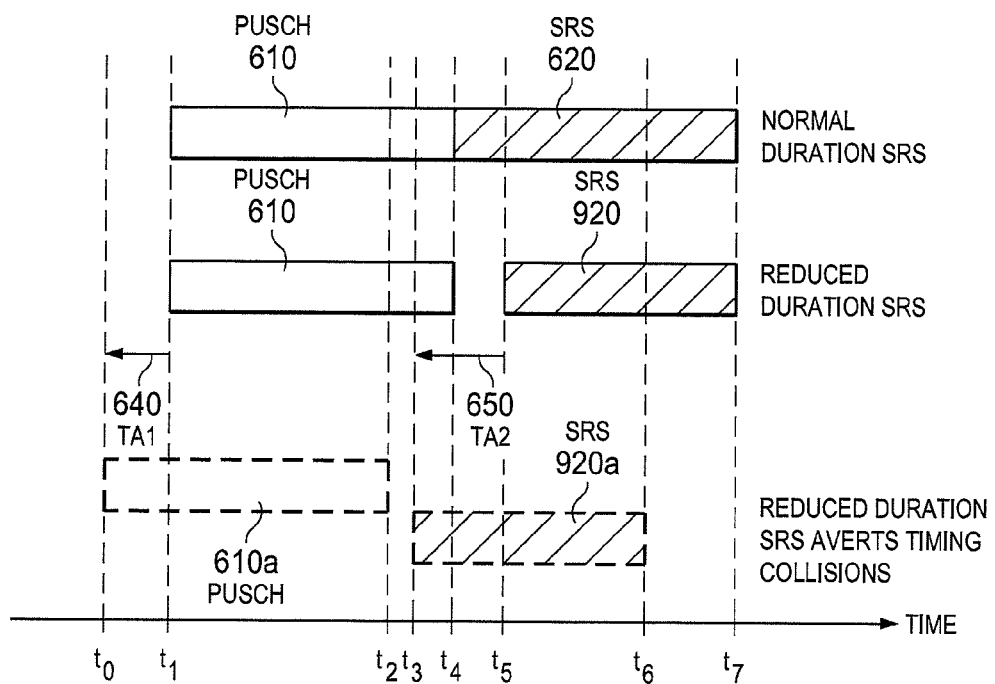
FIG. 9 illustrates shortening of the SRS symbol duration to prevent timing collisions according to embodiments of the present disclosure.

FIG. 9 illustrates shortening of the SRS symbol duration to prevent timing collisions according to embodiments of the present disclosure. The embodiment of the SRS reduction process shown in FIG. 9 is for illustration only. Other embodiments could be used without departing from the scope of this disclosure.

In certain embodiments, to avoid the potential timing collisions in SRS transmission during beam switching, the mobile station 300 employs a different duration for the SRS symbols than for other channels (such as data channels). More particularly, according to the SRS reduction method according to embodiments of the present disclosure, the duration of the SRS symbols is reduced compared to other symbols. The extent to which the duration of the SRS is reduced is determined based on the potential difference between the TA values for the different beam pair configurations. For example, the difference between different beam pair configurations can be ascertained based on channel measurements. The example in FIG. 9 shows that the duration of the SRS symbol has been reduced to prevent collisions between the different transmissions from the MS. The reduction of the SRS period may result in "quiet periods" during beam switching. A "quiet period" refers to a duration within which the MS 300 does not transmit any uplink signal.

When the mobile station 300 transmits a normal duration SRS, and when the mobile station 300 does not execute timing advance methods, the data 610 on the PUSCH is transmitted via a first beam to the base station 101 beginning at a time $t_1$ and ending at a time $t_4$. The SRS 620 is transmitted via a second beam pair to the base station 101 beginning at the time $t_4$ and ending at a time $t_7$.

When the mobile station 300 executes a timing advance method according to embodiments of the present disclosure, the mobile station 300 determines a first timing advance TA b 1640 that overcomes the propagation delays of the first beam pair; and determines a second timing advance TA2 650 that overcomes the propagation delays of the second beam pair. That, in overcoming the propagation delays of a beam pair, the mobile station 300 begins to transmit the time-advanced PUSCH data 610a at an instant $t_0$ and the mobile station 300 begins to transmit the time-advanced shortened SRS 920 at an instant.

When the mobile station 300 executes a reduced duration SRS method according to embodiments of the present disclosure, the SRS 620 is reduced by an amount that causes the mobile station to begin transmitting the reduced-duration SRS 920 after the time $t_2$ that the time-advanced PUSCH data 610a transmission ends. That is, the mobile station 300 executing the reduced duration SRS method reduces the length transmission of the SRS 620 by a time period of $t_4$-$t_5$ of FIG. 9, which is at least the length of the collision time period $t_2$-$t_3$ of FIG. 6.

The mobile station 300 executing both a reduced duration SRS method according to embodiments of the present disclosure and executing a timing advance method avoids timing collisions. The mobile station 300 transmits the time-advanced PUSCH data 610a from time $t_0$ to time $t_2$; and after time $t_2$, the mobile station 300 transmits the time-advanced, reduced-duration SRS 920a (which is the same as SRS 920, simply preponed) from time $t_3$ to time $t_6$. In certain embodiments, the time $t_3$ may occur at the same instant as time $t_2$, but not before. In certain embodiments, a quiet period (shown in FIG. 9) occurs between the time $t_2$ and the time $t_3$. The SRS symbol duration reduction method can be applied in a variety of different manners, as further discussed below with reference to FIGS. 12-15.

Figure 10:
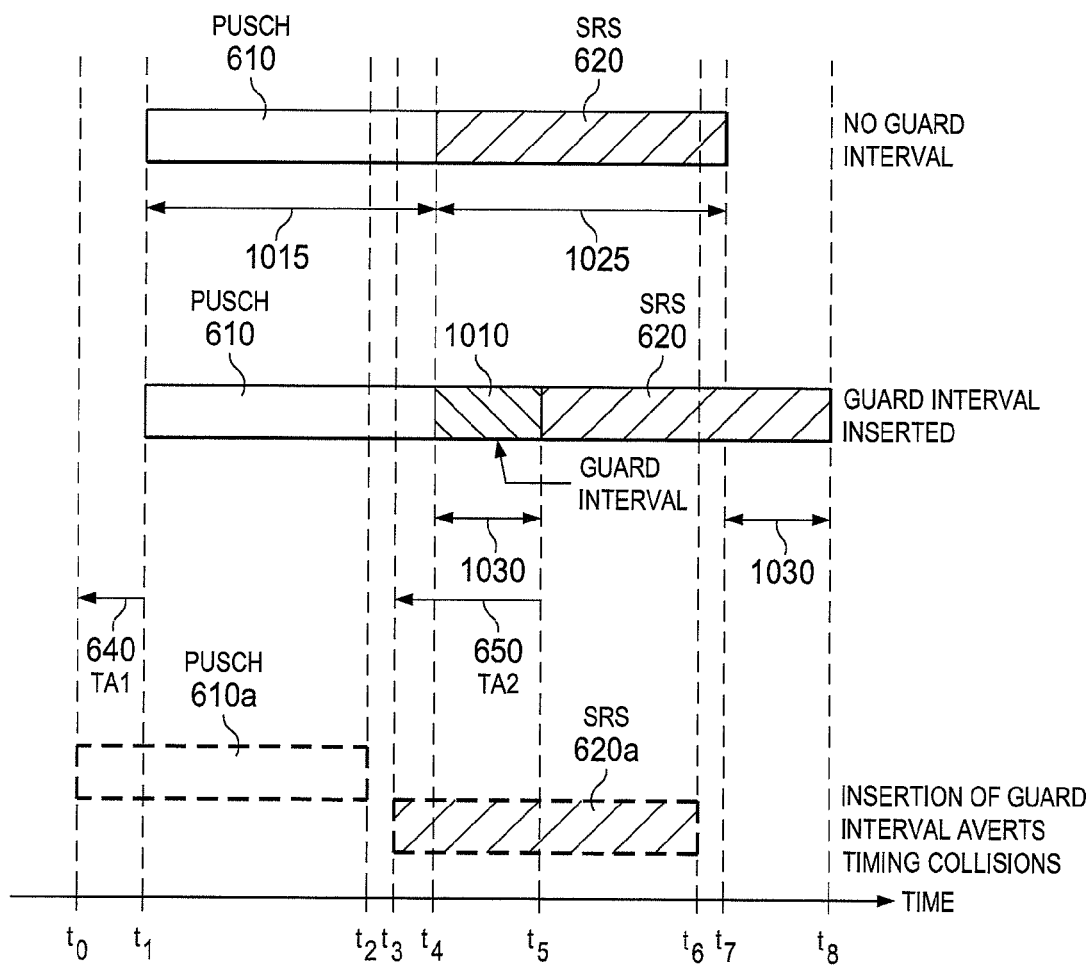
FIG. 10 illustrates insertion of a guard interval to prevent timing collisions according to embodiments of the present disclosure.

FIG. 10 illustrates insertion of a guard interval 1010 to prevent timing collisions according to embodiments of the present disclosure. The embodiment of the guard interval insertion process shown in FIG. 10 is for illustration only. Other embodiments could be used without departing from the scope of this disclosure.

In certain embodiments according to the present disclosure, the mobile station 300 inserts guard intervals 1010—meaning an interval during which no uplink transmission is scheduled—to overcome the problem of timing collisions that arise due to different TA on the different beam pairs. The mobile station 300 executing a guard interval insertion method does not reduce the duration of the SRS symbol, but inserts guard intervals 1010 to prevent timing collisions. The insertion of guard intervals 1010 can also be implemented in a variety of different manners, as further discussed below with reference to FIGS. 12-15. In particular, guard intervals 1010 can be inserted between a symbol of normal duration (e.g., PUSCH symbol 610) and a SRS symbol 620, between two SRS symbols, between a SRS symbol and a symbol of normal duration. Also, guard intervals of different durations can be inserted. For instance, guard intervals of duration $[\max(|TA(i1,j1)-TA(i2,j2)|)]$ or $2\times[\max(|TA(i1,j1)-TA(i2,j2)|)]$ can be inserted, depending on the location where the guard interval needs to be inserted. Certain conditions can cause the mobile station 300 to determine a length of a guard interval of a $1\times[\max(|TA(i1,j1)-TA(i2,j2)|)]$ duration to endure 0.035 microseconds. FIG. 10 shows an example of how the insertion of the guard interval helps avert timing collisions without reducing the SRS symbol duration.

A mobile station not executing a guard interval insertion method according to embodiments of the present disclosure and not executing a time advance method begins to transmit the PUSCH symbol of data 610 at a time $t_1$ and ends the transmission at a time $t_4$. A transmission of a PUSCH symbol of data 610 of a normal duration 1015 endures a length of the difference in time from time $t_1$ to time $t_4$. Next, that mobile station begins to transmits a SRS 620 at the time $t_4$ and completes the transmission at a time $t_7$. That is, the normal duration 1025 of the SRS 620 is a length of the difference in time from time $t_4$ to time $t_7$.

The mobile station 300 executing a guard interval insertion method according to embodiments of the present disclosure determines where to insert the guard interval 1010. The mobile station 300 knows that the PUSCH data 610 will not be shortened and determines that the PUSCH data 610 will be transmitted on the first base pair according to the corresponding timing advance TA1 640. The mobile station 300 determines that the SRS 620 of a normal duration 1025 is the next symbol to be transmitted using the second base pair according to the corresponding timing advance TA2 650. Based on these conditions (for example, type of preceding and subsequent signal, variability of the duration of each signal), the mobile station 300 determines that the duration 1030 of the guard interval 1010 needs to be $1\times[\max(|TA(i1,j1)-TA(i2,j2)|)]$ in order to prevent scheduling a transmission of the SRS 620 to begin before the end time $t_2$ of the PUSCH data 610 transmission. The mobile station 300 further determines one or more locations to insert a guard interval 1010. The mobile station 300 inserts the guard interval 1010, thereby scheduling the SRS 620 transmission to begin at the end of the guard interval 1010. That is, the mobile station schedules the guard interval to begin at the time $t_4$, the instant that the transmission of the PUSCH data 610 ends; and schedules the SRS 620 to begin at the time $t_5$, the instant that the guard interval 1010 ends. As a result of the delay imposed by inserting the guard interval 1010, the transmission of the SRS 620 is scheduled to end at a time $t_8$, which is later (by the duration 1030 of the guard interval 1010) than the time $t_7$ that the transmission of SRS 620 would end without insertion of the guard interval 1010.

By comparison, instead of using the a reduced duration SRS method to shorten the SRS 620 by 1×[max(|TA(i1,j1)−TA(i2,j2)|)], the mobile station 300 uses the guard interval insertion method to schedule a guard interval 1010 of a duration 1030 to postpone the SRS 620 transmission by 1×[max(|TA(i1,j1)−TA(i2,j2)|)].

When the mobile station 300 executes both a guard interval insertion method according to embodiments of the present disclosure and a timing advance method, in combination, the mobile station 300 avoids timing collisions. The mobile station 300 transmits the time-advanced PUSCH 610a from the time $t_0$ to the time $t_2$, where $t_0$ is earlier than $t_1$ by the duration of first timing advance TA1. The mobile station 300 transmits the time-advanced SRS 620a from the time $t_3$ to the time $t_6$, where $t_3$ is earlier than $t_5$ by the duration of the second timing advance TA2 corresponding to a second beam pair BP2on which the SRS 620a is communicated. In certain embodiments, the time $t_3$ may occur at the same instant as time $t_2$, but not before. In certain embodiments, a quiet period (shown in FIG. 10) occurs between the time $t_2$ and the time $t_3$.

Figure 11:
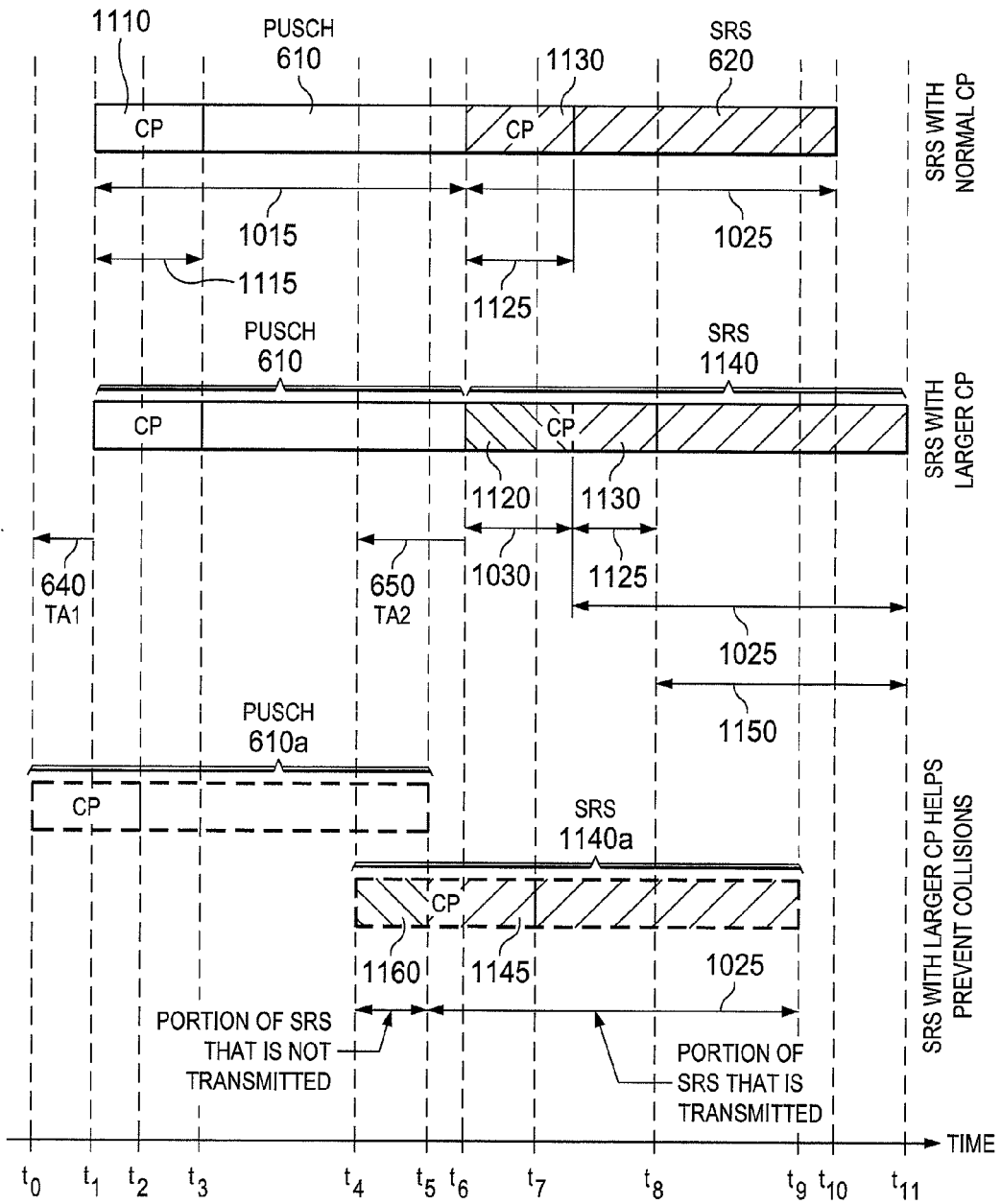
FIG. 11 illustrates enlarged cyclic prefix (CP) to prevent timing collisions according to embodiments of the present disclosure.

FIG. 11 illustrates an enlarged cyclic prefix (CP) to prevent timing collisions according to embodiments of the present disclosure. The embodiment of the SRS cyclic prefix enlargement process shown in FIG. 11 is for illustration only. Other embodiments could be used without departing from the scope of this disclosure.

A normal duration PUSCH data 610 transmission endures for a time period 1015, and a normal duration SRS 620 transmission endures for a time period 1025. Each symbol includes a CP: a normal duration PUSCH data 610 includes a CP 1110 with a duration 1115, and a normal duration SRS 620 includes a CP 1120 with a duration 1125. The increase 1130 in the CP duration is sufficient to cover potential collision or timing overlap of the symbols due to different TA values. That is, increase 1130 in the CP duration is at least as large as the duration of a potential collision or timing overlap of the symbols due to different TA values. The length 1030 of the increase 1130 in CP duration can therefore be either [max(|TA(i1,j1)−TA(i2,j2)|)] or 2×[max(|TA(i1,j1)−TA(i2,j2)|)], depending on the positioning of the SRS symbol within the subframe (for example, depending on whether the SRS symbol is preceded by or followed by other SRS symbols or not). To prevent collisions across symbols, the MS 300 only transmits that portion of the SRS CP that does not collide with the preceding symbol. Due to the increased overall duration of the SRS CP, transmission of only that portion of the CP that does not collide with the preceding symbol would still be sufficient to recover the SRS symbol correctly.

FIG. 11 shows an example of while transmitting the SRS 1140 symbol that has an enlarged CP, the MS 300 transmits only the CP portion 1145 that does not overlap with the preceding PUSCH symbol 610. Although FIG. 11 shows an example wherein the SRS symbol 1140 potentially collides with the preceding symbol 610, in cases when the SRS symbol 1140 potentially collides with a normal duration symbol (e.g., PUSCH symbol 610) following it, it would be plausible to not transmit the portion of the SRS symbol that collides with the PUSCH symbol following it. Due to the increased SRS CP duration, the BS 101 is able to correctly obtain the normal duration SRS symbol 620, as long as the MS 300 transmits SRS 1140 for a total duration spanning at least the sum of the SRS symbol period 1150 (i.e., without considering the CP including the increase 1130 and normal 1120 portions) and the channel delay spread.

A mobile station not executing an enlarged CP method according to embodiments of the present disclosure and not executing a timing advance method transmits a PUSCH data symbol 610 during a time period $t_1$ through $t_6$. That is, the mobile station transmits the CP 1110 of the PUSCH data symbol 610 during a time period $t_1$ through $t_3$. The mobile station transmits the remainder of the PUSCH data symbol 610 during a time period $t_3$ through $t_6$. Next, the mobile station transmits the SRS 620. That is, the mobile station transmits the CP 1120 of the SRS symbol 620 during a time period beginning at time $t_6$ and enduring for a duration 1125. Then, the mobile station transmits the remainder of the SRS symbol 620 during the time period that begins at the end of the transmission of the normal duration CP 1120 and ends at time $t_{10}$.

A mobile station 300 executing the enlarged SRS CP method according to embodiments of the present disclosure, but not executing a timing advance method transmits the PUSCH data symbol 610 during a time period $t_1$ through $t_6$, and then transmits a SRS 1140 with an enlarged CP. The enlarged CP includes a normal portion 1120 and an increase portion 1130. The mobile station transmits the enlarged CP from time $t_6$ to $t_8$. During the time $t_8$ through $t_{11}$, the mobile station transmits the remainder of the SRS symbol 1140, which is the same symbol of the SRS 620.

When the mobile station 300 executes, in combination, both the enlarged SRS CP method according to embodiments of the present disclosure and timing advance method, the mobile station transmits the time-advanced PUSCH symbol 610a from time $t_0$ to time $t_5$. That is, the mobile station 300 transmits the CP 1110 of the normal duration PUSCH data symbol 610 during a time period $t_0$ through $t_2$. The mobile station 300 transmits the remainder of the PUSCH data symbol 610 during a time period $t_2$ through $t_5$. Although the mobile station 300 is scheduled to begin transmitting the time-advanced SRS 1140a at the time $t_4$, which corresponds to the timing advance TA2 650 assigned to the second beam pair, the mobile station 300 does not transmit the portion 1160 of the SRS CP that would collide with the finishing portion of the PUSCH data 610a transmission. That is, the mobile station 300 will not transmit any portion of the SRS until the time $t_5$, which is when the PUSCH data 610a transmission is complete. Next, the mobile station 300 transmits the CP portion 1145 that does not overlap with the preceding PUSCH symbol 610. Next, the mobile station 300 transmits the remainder of the time-advanced SRS 1140a during the time period $t_7$ through $t_9$.

Figure 12:
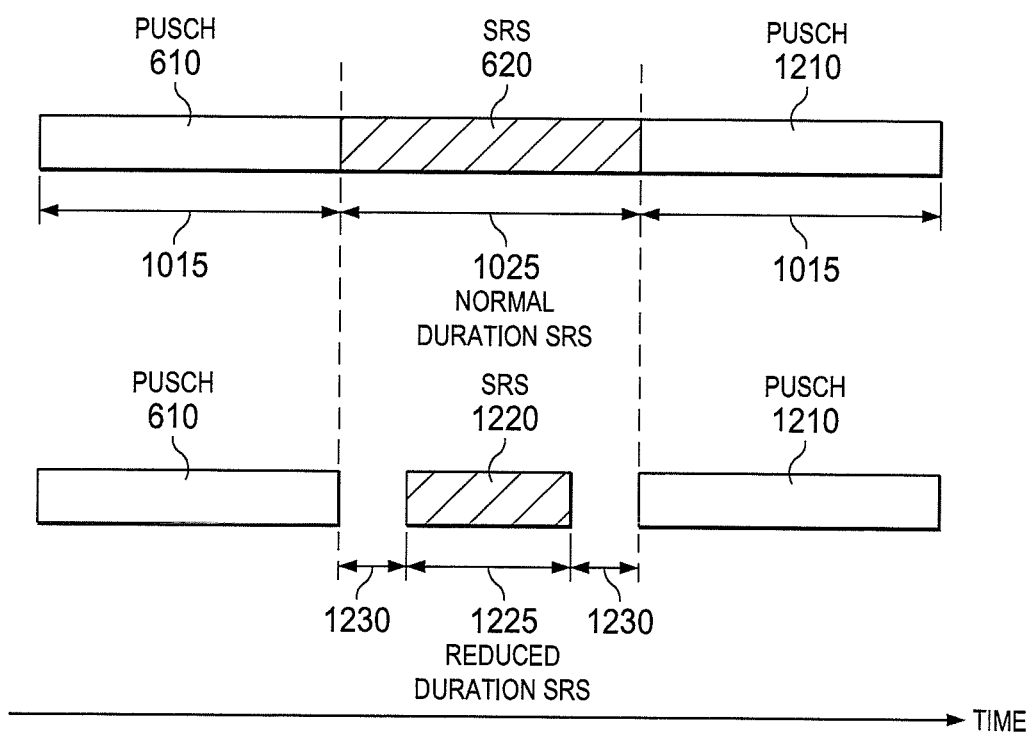
FIG. 12 illustrates SRS symbol shortening at both the beginning and end according to embodiments of the present disclosure.

FIG. 12 illustrates SRS symbol shortening applied at both the beginning and end according to embodiments of the present disclosure.

In certain embodiments of the present disclosure, the SRS symbol duration reduction 1230 (also referred to herein as "adjustment amount") depends on the TA values. In particular, according to the present disclosure, {TA(i,j)} denotes the set of all the timing advance values corresponding to the different beam pairs (i,j). According to the present disclosure, I denotes the set of possible transmit beam indices at the MS 300, and J denotes the set of possible receive beam indices at the BS 101. In the worst case, the timing overlap between consecutive symbols across which the beams are changed can be max (|TA(i1,j1)−TA(i2,j2)|), where the maximization is performed over all values of i1, i2, j1, j1, with i1 and i2 in I, and j1 and j2 in J. Since the overlap can occur at either the beginning or at the end of the SRS symbol (i.e., between the symbol preceding the SRS symbol and the SRS symbol, or, between the SRS symbol and the symbol following the SRS symbol), it is desirable to reduce the SRS symbol 620 duration by 2×[max(|TA(i1,j1)−TA(i2,j2)|)], with an equal amount [i.e., max(|TA(i1,j1)−TA(i2,j2)|)] being taken off at the beginning and at the end, as shown in FIG. 12. That is, the beginning of the SRS 620 is reduced by an adjustment amount 1230, and the end of the SRS 620 is reduced by the same adjustment amount 1230. That is, the symbols transmitted subsequent to the PUSCH 610 and prior to the PUSCH 1210 is a doubly-reduced-duration SRS signals 1220 with a reduced beginning portion and reduced finishing portion.

A "worst case scenario" includes wherein the SRS symbol 620 is preceded by a data symbol of normal duration 1015 (i.e., non-reduced duration; for example PUSCH data 610), and the SRS symbol 620 is also, followed by a symbol 1210 of normal duration 1015. In this example, the mobile station 300 reduces the SRS symbol 620 duration by [max(|TA(i1, j1)−TA(i2,j2)|)] at both, the beginning, as well as the end. As a result, the SRS 620 of a normal duration 1025 becomes the SRS 1220 of a doubly-reduced duration 1225.

In certain embodiments, while executing a guard interval insertion method, the mobile station 300 inserts a guard interval 1010 between the PUSCH 610 and SRS 620 based on knowledge that the PUSCH data 610 duration will not be adjusted and that the beginning of the SRS 620 duration can be adjusted. The mobile station 300 inserts a guard interval 1010 between the PUSCH 1210 and the doubly reduced SRS 1230 based on knowledge that the PUSCH data 1210 duration will not be adjusted and that the end of the preceding SRS 620 can be adjusted. The duration of the guard interval 1010 is the same duration as the adjustment amount 1230.

In certain embodiments, while executing the enlarged cyclic prefix method according to embodiments of the present disclosure, the mobile station increases the duration of the CP of a SRS 620. The duration of the increase 1130 of the CP is the same duration as the adjustment amount 1230.

Figure 13:
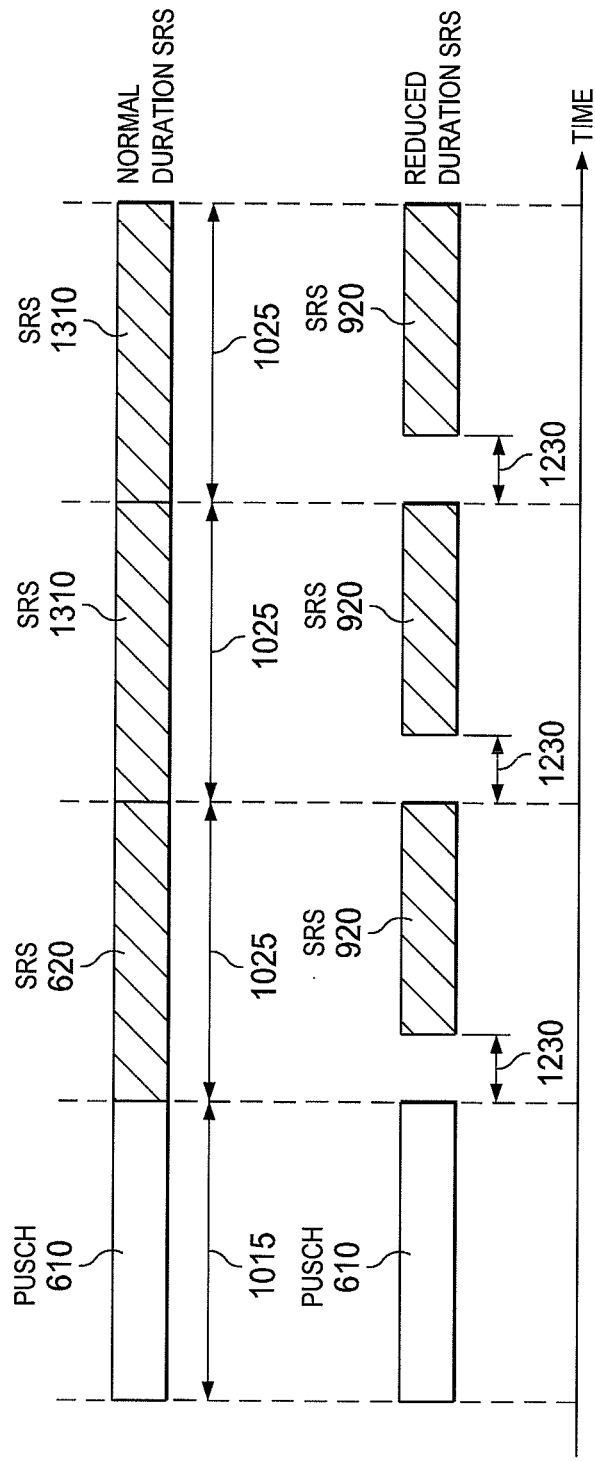
FIG. 13 illustrates SRS symbol shortening at the beginning of the symbol according to embodiments of the present disclosure.

FIG. 13 illustrates SRS symbol shortening at the beginning of the symbol according to embodiments of the present disclosure. In certain embodiments of the present disclosure, the SRS symbol 620 is not preceded and followed by a normal duration symbol. For example, the SRS symbol 620 can be preceded by, and/or followed by, another SRS symbol. In such an example, it may be sufficient to reduce the SRS symbol duration by [max(|TA(i1,j1)−TA(i2,j2)|)] only, rather than a reduction by 2×[max(|TA(i1,j1)−TA(i2,j2)|)]. The determination of the duration of the adjustment amount 1230 is also intimately linked to—meaning in part based on—the precise location of the SRS symbols within the subframe. In the example shown in FIG. 13, a sequence of symbols begins with a PUSCH symbol 610 (normal duration symbol), followed by a set of SRS symbols 620 and 1310. In this case, as shown, if an adjustment amount 1230 of the SRS symbol having a duration equal to [max(|TA(i1,j1)−TA(i2,j2)|)] is taken off at the beginning of all SRS symbols 620 and 1310, timing collisions are averted. That is, the symbols transmitted subsequent to the PUSCH 610 are reduced-duration SRS signals 920 with a reduced beginning portion.

Figure 14:
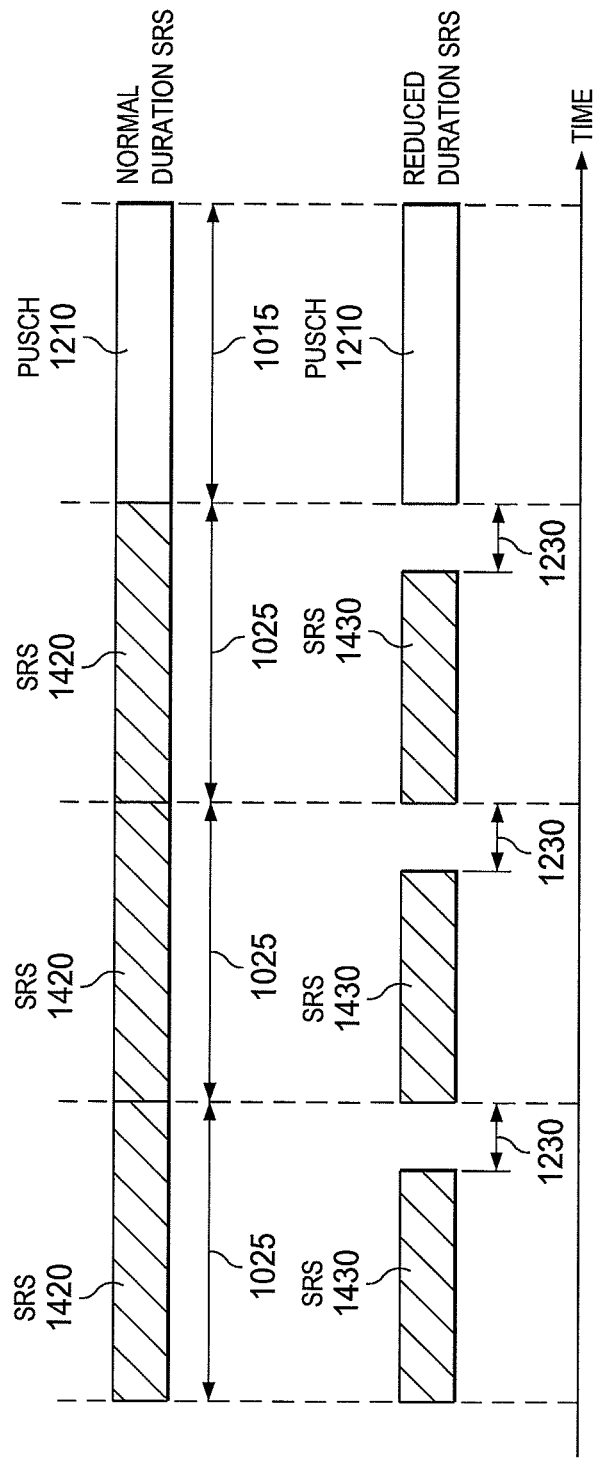
FIG. 14 illustrates SRS symbol shortening at the end of the symbol according to embodiments of the present disclosure.

On the other hand, FIG. 14 illustrates SRS symbol shortening at the end of the symbol according to embodiments of the present disclosure. In the example shown in FIG. 14, a sequence of symbols begins with a set of SRS symbols 1420, which is followed by a PUSCH symbol 1210 (normal duration symbol). In this example, as shown, if an adjustment amount 1230 of the SRS symbol having a duration equal to [max(|TA(i1,j1)−TA(i2,j2)|)] is taken off at the end of all SRS symbols 1420, timing collisions are avoided.

In certain embodiments, a mobile station 300 executing a guard interval insertion method, instead of a SRS reduction method the mobile station 300 inserts a guard interval between the PUSCH 1210 and SRS 1420 based on knowledge that the duration of the PUSCH data 1210 will not be adjusted and that the finishing end of the SRS 1420 duration can be adjusted. The mobile station 300 inserts a guard interval between the PUSCH 1210 and the reduced-duration SRS 1430 (shortened at the finishing end) based on knowledge that the PUSCH data 1210 duration will not be adjusted and that the end of the preceding SRS 620 can be adjusted to prevent timing collision. The duration of the guard interval is the same duration as the adjustment amount 1230.

In certain embodiments, the mobile station 300, while executing the enlarged cyclic prefix method according to embodiments of the present disclosure, increases the duration of the CP of a SRS 1420. The duration of the increase 1130 of the CP is the same duration as the adjustment amount 1230.

Figure 15:
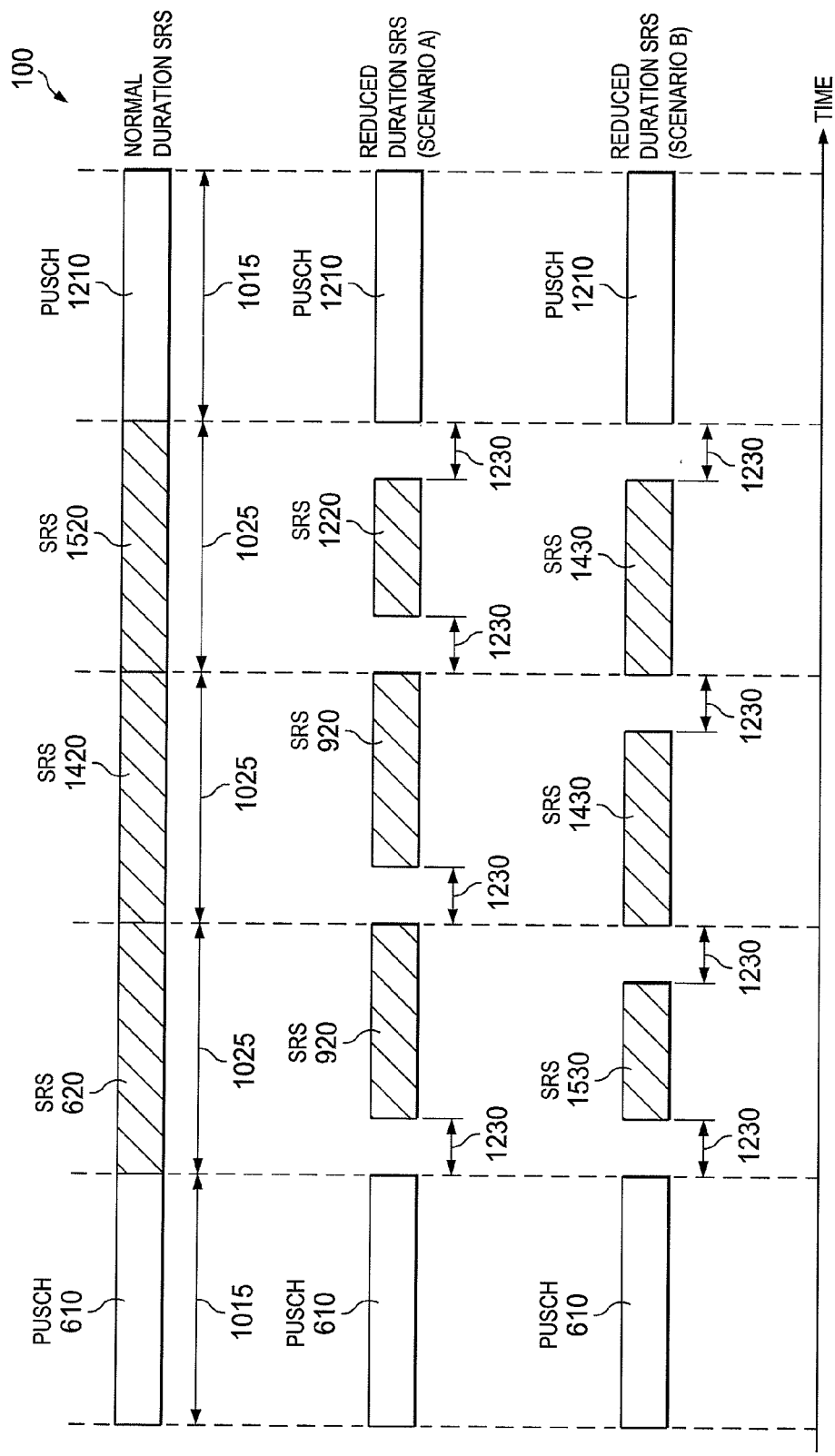
FIG. 15 illustrates non-uniform SRS symbol shortening methods applied to different SRS symbols according to embodiments of the present disclosure.

FIG. 15 illustrates non-uniform SRS symbol shortening methods applied to different SRS symbols according to embodiments of the present disclosure. According to certain embodiments of the present, a sequence that begins and ends with symbols of normal duration 610 and 1210 (e.g., PUSCH symbols), and has a set of SRS symbols in between, including a first SRS 620, a second SRS 1420, and a third SRS 1520. In a first case (a), an adjustment amount 1230 of duration [max(|TA(i1,j1)−TA(i2,j2)|)] is removed from the beginning of each SRS symbol 620, 1420, 1520 prevents. Although this shortening at the beginning of each SRS symbol 620, 1420, 1520 prevents most of the collision possibilities, a collision between the last SRS symbol 1520 and the PUSCH symbol 1210 following SRS 1520 may still result. Consequently, to overcome this problem, the mobile station 300 further reduces the duration of the last SRS symbol 1520, by removing an adjustment amount 1230 of duration [max(|TA(i1,j1)−TA(i2,j2)|)] at the end of the symbol 1520. That is, in response to a determination that the SRS 1520 follows a PUSCH data 610 or a SRS 620, 1420 with an un-shortened finishing portion, the mobile station 300 removes an adjustment amount 1230 from the beginning of the SRS. In response to a determination that the SRS 1520 precedes a PUSCH data 1210, the mobile station 300 removes an adjustment amount 1230 from the finishing end of the SRS 1520. As a result, the SRS 620 becomes the SRS 920 with a shortened beginning portion, and a normal finishing portion; the SRS 1420 becomes the SRS 920 with a shortened beginning portion, and a normal finishing portion; and the SRS 1520 becomes a doubly-reduced SRS 1220 with a shortened beginning and finishing portions.

In a second case (b), an adjustment amount 1230 of duration [max(|TA(i1,j1)−TA(i2,j2)|)] is removed from the end of each SRS symbol 620, 1420, 1520. While this prevents most of the collision possibilities, it may still result in a collision between the first SRS symbol 1530 and the PUSCH symbol of data 610 preceding it. Consequently, to overcome this problem, the mobile station 30 further reduces the duration of the first SRS symbol 1530, by taking out an adjustment amount having a duration [max(|TA(i1,j1)−TA(i2, j2)|)] at the beginning of the symbol 1530.

Both examples shown in FIG. 15 result in situations where the duration of all SRS symbols are reduced, however, the reduction in the duration is dependent on the location of the SRS symbol. More particularly, the reduction in the duration of all SRS symbols may not be identical.

In certain embodiments described above, the duration of the SRS symbol is reduced by [max(|TA(i1,j1)−TA(i2,j2)|)]. (for example if the SRS symbol is preceded by, and, followed by, other SRS symbols). In certain embodiments of the present disclosure, the mobile station 300 executes other methods to reduce the duration of the SRS symbol. For example, the duration can be reduced by removing an adjustment portion from both the beginning and the end of the SRS symbol, as long as the sum of the durations (i.e., adjustment portion) is still [max(|TA(i1,j1)−TA(i2,j2)|)] . For example, adjustment portions having a duration of [max(|TA(i1,j1)−TA(i2,j2)|)]/2 may be removed from the beginning and the end of the SRS symbol.

According to the methods disclosed to prevent timing collisions: (a) the duration of the SRS symbols is reduced, or (b) a guard interval is inserted, or (c) the duration of the CP of the SRS symbols in increased. These the methods rely on the knowledge of the timing advance values for the different beam pairs, which help determine the precise parameters (namely, SRS duration reduction in (a), guard interval duration in (b), SRS CP duration increase in (c)) to use in either of the three scenarios. In certain embodiments, the parameters are pre-configured at the time of system design. For instance, the different TA values for the beam pairs are known (for example, based on channel measurements), and these known TA values are used to obtain the parameters to use. The TA values depend on the location of the MS, so that such a pre-configured design should attempt to prevent collisions for all possible sets of TA values.

In certain embodiments, the (SRS duration reduction in (a), guard interval duration in (b), SRS CP duration increase in (c)) are configured on a MS-specific basis, and can be made adaptive over time. More particularly, the parameters can take different values for different MSs (or different MS categories), and the parameters for a particular MS can also vary over time. Different MSs are subject to different propagation environments, which can potentially change over time. In such a scenario, for a particular MS, the parameters are configured based on the prevailing TA values for that particular MS. The TA values for a particular MS are set to some initial values, and then updated periodically based on commands sent by the BS 101. Consequently, once the initial TA, or, TA update, commands are sent by the BS 101 to the MS 300, the MS adjusts the parameters (corresponding to embodiments (a), (b), (c) described above). The mobile station 300 informs the BS of such changes to the parameters, and in response, the BS 101 acknowledges receipt of the information regarding updated parameters. In certain embodiments, the BS 101, along with providing the MS 300 with the initial TA values to use (or the updates to the TA values), instructs the MS 300 to use particular values for the relevant parameters corresponding to the embodiments (a), (b) and (c). The MS 300 acknowledges receipt of these TA values and instructions to use the received TA values to the BS 101, and then the agreed parameter values are used for SRS transmission.

In certain embodiments, the values for the parameters in embodiments (a), (b), (c), are constrained or otherwise limited to a discrete set of values (rather than being allowed to take any desired value). For instance, the increase in the SRS CP duration in scenario (c) could be restricted to a selection of one out of four discrete values. Limiting the parameters (namely, the adjustment amount 1230) to a discrete set of values facilitates low overhead exchange of parameter values between the BS 101 and the MS 300.

If the preceding parameters are configured on a MS-specific basis, implications are imposed on the multiplexing of the SRS transmitted by different MSs to the BS 300. For example, according to a SRS reduction method embodiment (a), if the SRS duration for two MSs are different (implying different FFT and IFFT lengths in an OFDM system), it may not be possible for these two MSs to transmit their SRS at the same time in a frequency multiplexed manner The BS 101 can ensure that this does not occur, by frequency multiplexing the SRS of MSs with identical SRS durations only. When the SRS from different MSs must be time multiplexed across the different symbols in a particular subframe, still the BS 101 selects to multiplex only MSs with identical SRS durations.

In certain embodiments, the reduction in the SRS symbol duration (or guard interval duration, or increase in the SRS CP duration; namely the adjustment amount 1230) is based on the time it will take for the physical operation of beam switching to actually occur. That is, the duration of the SRS symbol can be further be reduced, or the duration of guard interval, or the SRS CP duration may further be increased.

In certain embodiments, the BS 101 does not schedule a MS 300 for uplink PUSCH 610 and uplink SRS transmission within the same subframe. In general, the BS 101 follows certain procedures which ensure that the MS 300 does not need to switch beams during a particular subframe, so that a different TA need not be applied within the same subframe.

Various embodiments of the present disclosure have been described with reference to the issues arising in uplink SRS transmission, and similar issues can arise in transmission of other information, whenever the MS needs to switch beams and hence to apply a different TA. Consequently, the methods disclosed to avert the timing collisions presented herein can be applied in other scenarios as well.

Although the present disclosure has been described with examples, various changes and modifications may be suggested to one skilled in the art. It is intended that the present disclosure encompass such changes and modifications as fall within the scope of the appended claims.

What is claimed is:

1. A method for preventing timing collisions in a wireless communication network, the method comprising:
   generating a first symbol for uplink transmission using a first beam pair between a mobile station and a base station;
   scheduling a transmission of the first symbol to the base station through the first beam pair to commence at a first time and to end the transmission of the first symbol at a second time subsequent to the first time;
   generating a sounding reference signal (SRS) for uplink transmission using a second beam pair different from the first beam pair;
   scheduling a transmission of the SRS to the base station to commence at the second time;
   determining a first timing advance corresponding to the first base pair;
   determining a second timing advance corresponding to the second base pair;
   transmitting the first symbol through the first beam pair at an initial time in advance of the first time by an amount of the first timing advance;
   determining a third time in advance of the second time by an amount of a second timing advance;
   calculating and applying an adjustment amount to one of:
      delay the transmission of the SRS by rescheduling the transmission of the SRS to commence at a delayed time subsequent to the second time, and modify a duration of the SRS; and
   transmitting one of:
   the delayed SRS through the second beam pair at a fourth time in advance of the delayed time by an amount of the second timing advance corresponding to the second beam pair, and
   the modified SRS through the second beam pair at a fifth time that is subsequent to the third time and in advance of the second time.

2. The method as set forth in claim 1, wherein modifying the duration of the SRS comprises reducing the duration of the SRS by the adjustment amount.

3. The method as set forth in claim 2, wherein scheduling the transmission of the SRS to the base station to commence at the second time further comprises scheduling the transmission of the SRS to end the transmission of the SRS at a sixth time subsequent to the second time by a length of the unmodified duration of the SRS, yielding a scheduled SRS period between the second time and the sixth time, and
wherein reducing the duration of the SRS by the adjustment amount comprises one of:
reducing the duration of the SRS at a beginning of the scheduled SRS period by defining the fifth time to be in advance of the second time by a difference between the adjustment amount and the second timing advance;
reducing the duration of the SRS at a finishing of the scheduled SRS period by completing transmission of the modified SRS in advance of the sixth time by at least the adjustment amount;
reducing the duration of the SRS at both the beginning and the finishing of the scheduled SRS period.

4. The method as set forth in claim 1, wherein modifying the duration of the SRS comprises enlarging a duration of a cyclic prefix of the SRS by the adjustment amount.

5. The method as set forth in claim 4, further comprising refraining from transmitting a portion of the enlarged cyclic prefix of the SRS scheduled to be transmitted during a time period between the third time and the end of the transmission of the first symbol.

6. The method as set forth in claim 1, wherein delaying the transmission of the SRS comprises:
scheduling a guard interval to commence at the second time and end at the delayed time, the guard interval having a duration equal to the adjustment amount; and
delaying the transmission of the SRS by scheduling the transmission of the SRS to the base station to commence upon completion of the guard interval duration.

7. The method as set forth in claim 1, wherein calculating the adjustment amount further comprises:
in response to determining that a timing collision can occur at a beginning portion of the scheduled transmission of the SRS, the adjustment amount duration is $1 \times [\max(|TA(i1,j1)-TA(i2,j2)|)]$;
in response to determining that a timing collision can occur at a finishing portion of the scheduled transmission of the SRS, the adjustment amount duration is $1 \times [\max(|TA(i1,j1)-TA(i2,j2)|)]$; and
in response to determining that a timing collision can occur at the beginning portion and the finishing portion of the scheduled transmission of the SRS, the adjustment amount duration is $2 \times [\max(|TA(i1,j1)-TA(i2,j2)|)]$, wherein:
$[\max(|TA(i1,j1)-TA(i2,j2)|)]$ represents a maximization performed over all values in a set of possible transmit beam indices at the mobile station and in a set of possible receive beam indices at the base station,
TA(i1,j1) represents the first timing advance corresponding to a beam pair (i1,j1) possible for the first beam pair,
TA(i2,j2) represents the second timing advance corresponding to a beam pair (i2,j2) possible for the second beam pair,
i1 and i2 represent two transmit beam indices included in the set of possible transmit beam indices at the mobile station, and
j1 and j2 represent two receive beam indices included in the set of possible receive beam indices at the base station.

8. The method as set forth in claim 1, wherein the adjustment amount is computed and applied in a mobile station-specific manner, such that the adjustment amount is different for different mobile stations.

9. The method as set forth in claim 1, wherein the adjustment amount is adaptive over time, wherein one of:
the adjustment amount is computed by the mobile station and communicated to the base station, and
the adjustment amount is computed by the base station and communicated to the mobile station.

10. A mobile station for use in a wireless communication network, the mobile station comprising:
a transmitter configured to send control and data signals to a base station; and
processing circuitry configured to:
generate a first symbol for uplink transmission using a first beam pair between the mobile station and a base station;
schedule a transmission of the first symbol to the base station through the first beam pair to commence at a first time and to end the transmission of the first symbol at a second time subsequent to the first time;
generate a sounding reference signal (SRS) for uplink transmission a second beam pair different from the first beam pair;
schedule a transmission of the SRS to the base station to commence at the second time;
determine a first timing advance corresponding to the first base pair;
determine a second timing advance corresponding to the second base pair;
transmit the first symbol through the first beam pair at an initial time in advance of the first time by an amount of the first timing advance;
determine a third time in advance of the second time by an amount of the second timing advance;
calculate and apply an adjustment amount to one of: delay the transmission of the SRS by rescheduling the transmission of the SRS to commence at a delayed time subsequent to the second time, and modify a duration of the SRS: and
transmit one of:
the delayed SRS through the second beam pair at a fourth time in advance of the delayed time by an amount of the second timing advance corresponding to the second beam pair, and
the modified SRS through the second beam pair at a fifth time that is subsequent to the third time and in advance of the second time.

11. The mobile station as set forth in claim 10, wherein the processing circuitry is further configured to: modify the duration of the SRS by reducing the duration of the SRS by the adjustment amount.

12. The mobile station as set forth in claim 11, wherein scheduling the transmission of the SRS to the base station to commence at the second time further comprises scheduling the transmission of the SRS to end the transmission of the SRS at a sixth time subsequent to the second time by a length of the unmodified duration of the SRS, yielding a scheduled SRS period between the second time and the sixth time, and
wherein reducing the duration of the SRS by the adjustment amount comprises one of:
reducing the duration of the SRS at a beginning of the scheduled SRS period by defining the fifth time to be in advance of the second time by a difference between the adjustment amount and the second timing advance;

reducing the duration of the SRS at a finishing of the scheduled SRS period by completing transmission of the modified SRS in advance of the sixth time by at least the adjustment amount;

reducing the duration of the SRS at both the beginning and the finishing of the scheduled SRS period.

13. The mobile station as set forth in claim 10, wherein modifying the duration of the SRS comprises enlarging a duration of a cyclic prefix of the SRS by the adjustment amount.

14. The mobile station as set forth in claim 13, wherein the processing circuitry is further configured to: refrain from transmitting a portion of the enlarged cyclic prefix of the SRS scheduled to be transmitted during a time period between the third time and the end of the transmission of the first symbol.

15. The mobile station as set forth in claim 10, wherein delaying the transmission of the SRS comprises:

scheduling a guard interval to commence at the second time and end at the delayed time, the guard interval having a duration equal to the adjustment amount; and delaying the transmission of the SRS by scheduling the transmission of the SRS to the base station to commence upon completion of the guard interval duration.

16. The mobile station as set forth in claim 10, wherein calculating the adjustment amount further comprises:

in response to determining that a timing collision can occur at a beginning portion of the scheduled transmission of the SRS, the adjustment amount duration is $1 \times [\max(|TA(i1,j1) - TA(i2,j2)|)]$;

in response to determining that a timing collision can occur at a finishing portion of the scheduled transmission of the SRS, the adjustment amount duration is $1 \times [\max(|TA(i1,j1) - TA(i2,j2)|)]$; and in response to determining that a timing collision can occur at the beginning portion and the finishing portion of the scheduled transmission of the SRS, the adjustment amount duration is $2 \times [\max(|TA(i1,j1) - TA(i2,j2)|)]$, wherein:

$[\max(|TA(i1,j1) - TA(i2,j2)|)]$ represents a maximization performed over all values in a set of possible transmit beam indices at the mobile station and in a set of possible receive beam indices at the base station, $TA(i1,j1)$ represents the first timing advance corresponding to a beam pair $(i1,j1)$ possible for the first beam pair, $TA(i2,j2)$ represents the second timing advance corresponding to a beam pair $(i2,j2)$ possible for the second beam pair, i1 and i2 represent two transmit beam indices included in the set of possible transmit beam indices at the mobile station, and j1 and j2 represent two receive beam indices included in the set of possible receive beam indices at the base station.

17. The mobile station as set forth in claim 10, wherein the adjustment amount is adaptive over time, wherein:

the adjustment amount is communicated to the base station.

18. A wireless communication system comprising:

a mobile station comprising:

an antenna array comprising a plurality of antennas;

a transmitter configured to send control and data signals to a base station that is configured to form beams in a directional communication system and receive uplink signals from the mobile station; and processing circuitry configured to:

generate a first symbol for uplink transmission using a first beam pair between the mobile station and the base station;

schedule a transmission of the first symbol to the base station through the first beam pair to commence at a first time and to end the transmission of the first symbol at a second time subsequent to the first time;

generate a sounding reference signal (SRS) for uplink transmission using a second beam pair different from the first beam pair;

schedule a transmission of the SRS to the base station to commence at the second time;

determine a first timing advance corresponding to the first base pair;

determine a second timing advance corresponding to the second base pair;

transmit the first symbol through the first beam pair at an initial time in advance of the first time by an amount of the first timing advance;

determine a third time in advance of the second time by an amount of the second timing advance; and calculate and apply an adjustment amount to one of: delay the transmission of the SRS by rescheduling the transmission of the SRS to commence at a delayed time subsequent to the second time, and modify a duration of the SRS: and transmit one of:

the delayed SRS through the second beam pair at a fourth time in advance of the delayed time by an amount of the second timing advance corresponding to the second beam pair, and the modified SRS through the second beam pair at a fifth time that is subsequent to the third time and in advance of the second time.

19. The system as set forth in claim 18, wherein the mobile station is further configured to: modify the duration of the SRS by reducing the duration of the SRS by the adjustment amount.

20. The system as set forth in claim 19, wherein scheduling the transmission of the SRS to the base station to commence at the second time further comprises scheduling the transmission of the SRS to end the transmission of the SRS at a sixth time subsequent to the second time by a length of the unmodified duration of the SRS, yielding a scheduled SRS period between the second time and the sixth time, and wherein reducing the duration of the SRS by the adjustment amount comprises one of:

reducing the duration of the SRS at a beginning of the scheduled SRS period by defining the fifth time to be in advance of the second time by a difference between the adjustment amount and the second timing advance;

reducing the duration of the SRS at a finishing of the scheduled SRS period by completing transmission of the modified SRS in advance of the sixth time by at least the adjustment amount;

reducing the duration of the SRS at both the beginning and the finishing of the scheduled SRS period.

21. The system as set forth in claim 18, wherein modifying the duration of the SRS comprises enlarging a duration of a cyclic prefix of the SRS by the adjustment amount.

22. The system as set forth in claim 21, wherein the mobile station is further configured to: refrain from transmitting a portion of the enlarged cyclic prefix of the SRS scheduled to be transmitted during a time period between the third time and the end of the transmission of the first symbol.

23. The system as set forth in claim 18, wherein delaying the transmission of the SRS comprises:

scheduling a guard interval to commence at the second time and end at the delayed time, the guard interval having a duration equal to the adjustment amount; and delaying the transmission of the SRS by scheduling a transmission of the SRS to the base station to commence upon completion of the guard interval duration.

24. The system as set forth in claim 18, wherein calculating the adjustment amount further comprises:

in response to determining that a timing collision can occur at a beginning portion of the scheduled transmission of the SRS, the adjustment amount duration is $1 \times [\max(|TA(i1,j1)-TA(i2,j2)|)]$;

in response to determining that a timing collision can occur at a finishing portion of the scheduled transmission of the SRS, the adjustment amount duration is $1 \times [\max(|TA(i1,j1)-TA(i2,j2)|)]$; and in response to determining that a timing collision can occur at the beginning portion and the finishing portion of the scheduled transmission of the SRS, the adjustment amount duration is $2 \times [\max(|TA(i1,j1)-TA(i2,j2)|)]$, wherein:

$[\max(|TA(i1,j1)-TA(i2,j2)|)]$ represents a maximization performed over all values in a set of possible transmit beam indices at the mobile station and in a set of possible receive beam indices at the base station, $TA(i1,j1)$ represents the first timing advance corresponding to a beam pair $(i1,j1)$ possible for the first beam pair, $TA(i2,j2)$ represents the second timing advance corresponding to a beam pair $(i2,j2)$ possible for the second beam pair, i1 and i2 represent two transmit beam indices included in the set of possible transmit beam indices at the mobile station, and j1 and j2 represent two receive beam indices included in the set of possible receive beam indices at the base station.

25. The system as set forth in claim 18, wherein the adjustment amount is adaptive over time, wherein:

the adjustment amount is communicated to the base station.

* * * * *